(12) United States Patent
Uechi et al.

(10) Patent No.: US 10,287,922 B2
(45) Date of Patent: May 14, 2019

(54) STEAM TURBINE PLANT, COMBINED CYCLE PLANT PROVIDED WITH SAME, AND METHOD OF OPERATING STEAM TURBINE PLANT

(71) Applicant: MITSUBISHI HEAVY INDUSTRIES, LTD., Tokyo (JP)

(72) Inventors: Hideyuki Uechi, Tokyo (JP); Hideaki Sugishita, Tokyo (JP); Yuichi Oka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 124 days.

(21) Appl. No.: 15/547,280

(22) PCT Filed: Feb. 6, 2015

(86) PCT No.: PCT/JP2015/053376
§ 371 (c)(1),
(2) Date: Jul. 28, 2017

(87) PCT Pub. No.: WO2016/125300
PCT Pub. Date: Aug. 11, 2016

(65) Prior Publication Data
US 2018/0003085 A1 Jan. 4, 2018

(51) Int. Cl.
*F01K 3/26* (2006.01)
*F01K 7/16* (2006.01)
(Continued)

(52) U.S. Cl.
CPC ............. *F01K 7/22* (2013.01); *F01K 3/26* (2013.01); *F01K 7/16* (2013.01); *F01K 7/24* (2013.01);
(Continued)

(58) Field of Classification Search
CPC ..... F01K 7/22; F01K 7/24; F01K 7/32; F01K 23/10; F01K 23/106; F01K 13/00;
(Continued)

(56) References Cited

U.S. PATENT DOCUMENTS 2,802,114 A * 8/1957 Artsay ...................... F01K 7/32
290/2
2,959,014 A * 11/1960 Artsay ...................... F01K 7/32
122/479.4

(Continued)

FOREIGN PATENT DOCUMENTS

DE 1 074 326 1/1960
DE 2 205 807 8/1973
(Continued)

OTHER PUBLICATIONS

Igor Pioro and Sarah Mokry (2011). Thermophysical Properties at Critical and Supercritical Pressures, Available from: https://www.intechopen.com/books/heat-transfer-theoretical-analysis-experimental-investigations-and-industrial-systems/thermophysical-properties-at-critical-and-supercritical-pressures (Year: 2011).*

(Continued)

*Primary Examiner* — Mark A Laurenzi
*Assistant Examiner* — Xiaoting Hu
(74) *Attorney, Agent, or Firm* — Wenderoth, Lind & Ponack, L.L.P.

(57) ABSTRACT

A boiler includes one or more evaporators configured to heat water which has flowed therein to a specific heat maximum temperature at constant pressure or more in which a specific heat at constant pressure is maximized using a heated fluid and one or more reheaters configured to heat the steam which has come from the boiler using the heated fluid. All the reheaters configured to supply steam to a low-pressure steam turbine are disposed only at a downstream side of the (Continued)

high-pressure evaporator. All the reheaters heat reheating steam (FRHS) containing steam which has passed through a high-pressure steam turbine configured to receive steam supplied from the high-pressure evaporator and having a temperature lower than a specific heat maximum temperature at constant pressure in the high-pressure evaporator to less than the specific heat maximum temperature at constant pressure.

6 Claims, 9 Drawing Sheets

(51) Int. Cl.
*F01K 7/22* (2006.01)
*F01K 7/24* (2006.01)
*F01K 7/32* (2006.01)
*F01K 11/02* (2006.01)
*F01K 13/00* (2006.01)
*F01K 13/02* (2006.01)
*F01K 23/08* (2006.01)
*F01K 23/10* (2006.01)

(52) U.S. Cl.
CPC ............... *F01K 7/32* (2013.01); *F01K 11/02* (2013.01); *F01K 13/00* (2013.01); *F01K 13/02* (2013.01); *F01K 23/08* (2013.01); *F01K 23/10* (2013.01); *F01K 23/106* (2013.01); *Y02E 20/16* (2013.01)

(58) Field of Classification Search
CPC . F01K 13/02; F01K 3/185; F01K 3/20; F01K 3/22; F01K 11/02; F01K 7/16; F01K 7/165; Y02E 20/16
See application file for complete search history.

(56) References Cited

U.S. PATENT DOCUMENTS

| | | | | |
|---|---|---|---|---|
| 3,683,621 | A | * | 8/1972 | Szewalski ................. F01K 7/22 60/647 |
| 4,858,562 | A | * | 8/1989 | Arakawa ............... F01K 23/106 122/7 R |
| 5,044,163 | A | * | 9/1991 | Bruckner ............... F01K 23/101 60/39.182 |
| 5,570,578 | A | * | 11/1996 | Saujet ...................... F01K 7/32 122/1 R |
| 6,389,797 | B1 | | 5/2002 | Sugishita et al. |
| 7,874,162 | B2 | | 1/2011 | Tomlinson et al. |
| 2003/0043952 | A1 | | 3/2003 | Itou et al. |
| 2004/0148941 | A1 | * | 8/2004 | Wylie ................... F01K 23/103 60/772 |
| 2016/0003159 | A1 | | 1/2016 | Hotta |

FOREIGN PATENT DOCUMENTS

| | | | |
|---|---|---|---|
| GB | 845202 A | * 8/1960 | ............... F01K 7/32 |
| GB | 1 355 952 | 6/1974 | |
| JP | 59-175610 | 11/1984 | |
| JP | 3-108805 | 11/1991 | |
| JP | 2001-214759 | 8/2001 | |
| JP | 2003-74309 | 3/2003 | |
| JP | 2009-92372 | 4/2009 | |
| JP | 2014-185612 | 10/2014 | |

OTHER PUBLICATIONS

International Search Report dated May 19, 2015 in International Application No. PCT/JP2015/053376, with English-language translation.
Written Opinion of the International Searching Authority dated May 19, 2015 in International Application No. PCT/JP2015/053376, with English-language translation.

\* cited by examiner

STEAM TURBINE PLANT, COMBINED CYCLE PLANT PROVIDED WITH SAME, AND METHOD OF OPERATING STEAM TURBINE PLANT

BACKGROUND OF THE INVENTION

Field of the Invention

The present invention relates to a steam turbine plant including a boiler configured to generate steam and a plurality of steam turbines driven using the steam from the boiler, a combined cycle plant including the same, and a method of operating a steam turbine plant.

Description of Related Art

The steam turbine plant disclosed in Patent Document 1 includes a waste heat recovery boiler configured to generate steam using heat of an exhaust gas from a gas turbine and a plurality of steam turbines.

The steam turbine plant includes a high-pressure steam turbine, an intermediate-pressure steam turbine driven using the steam which has been exhausted from the high-pressure steam turbine, and a low-pressure steam turbine driven using the steam which has been exhausted from the intermediate-pressure steam turbine and reheated as a plurality of steam turbines. The waste heat recovery boiler includes a high-pressure economizer (HPECO1) configured to heat water supplied to the high-pressure steam turbine, a high-pressure evaporator (HPEVA) configured to heat the water which has been heated by the high-pressure economizer (HPECO1) and to convert the water into steam, a downstream high-pressure superheater (HPSH2) configured to superheat the steam which has been generated by the high-pressure evaporator (HPEVA), an upstream high-pressure superheater (HPSH1) configured to further superheat the steam which has been superheated by the downstream high-pressure superheater (HPSH2), a downstream reheater (RH2) configured to heat the steam which has been exhausted from the intermediate-pressure steam turbine, and an upstream reheater (RH1) configured to further heat the steam which has been heated by the downstream reheater (RH2). The steam which has been superheated by the upstream high-pressure superheater (HPSH1) is supplied to the high-pressure steam turbine as high-pressure steam. Furthermore, the steam which has been heated by the upstream reheater (RH1) is supplied to the low-pressure steam turbine as reheated steam.

The downstream reheater (RH2) is disposed further downstream than high-pressure evaporator (HPEVA) in a direction in which an exhaust gas flows through the waste heat recovery boiler. Furthermore, the upstream reheater (RH1) is disposed further upstream than the high-pressure evaporator (HPEVA) in the direction in which the exhaust gas flows. Therefore, the steam which has been heated by the downstream reheater (RH2) disposed further downstream than the high-pressure evaporator (HPEVA) and the upstream reheater (RH1) disposed further upstream than the high-pressure evaporator (HPEVA) is supplied to the low-pressure steam turbine.

Patent Documents

[Patent Document 1] Japanese Unexamined Patent Application, First Publication No. 2009-92372

SUMMARY OF THE INVENTION

In a steam turbine plant, it is desirable to increase efficiency of the entire plant.

Therefore, an objective of the present invention is to provide a steam turbine plant capable of increasing efficiency in the entire plant, a combined cycle plant including the same, and a method of operating a steam turbine plant.

A steam turbine plant serving as an aspect according to the invention for the purpose of accomplishing the above-described objective is a steam turbine plant including: a boiler configured to heat water using a heated fluid to generate steam; a steam turbine driven using the steam from the boiler, wherein the boiler includes one or more evaporators configured to heat the water which has flowed therein to a specific heat maximum temperature at constant pressure or more in which a specific heat at constant pressure is maximized using the heated fluid and to convert the water into steam and one or more reheaters configured to heat the steam Which has come from the boiler using the heated fluid, a first steam turbine configured to receive steam supplied from a high-pressure evaporator into which water with the highest pressure flows among the one or more evaporators and a second steam bine to which the steam which has been heated by the one or more reheaters is supplied are provided as the steam turbine, all the reheaters configured to supply the steam to the second steam turbine are disposed only at one side of a downstream side and an upstream side of the high-pressure evaporator in a direction in which the heated fluid flows, and when all the reheaters are disposed only at the downstream side, all the reheaters heat reheating steam at least containing the steam which has passed through the first steam turbine and having a temperature lower than a high-pressure maximum temperature which is the specific heat maximum temperature at constant pressure in the high-pressure evaporator to less than the high-pressure maximum temperature, and when all the reheaters are disposed only at the upstream side, all the reheaters heat reheating steam at least containing the steam which has passed through the first steam turbine and having a temperature higher than the high-pressure maximum temperature.

An output obtained from the entire steam turbine group is larger when an energy drop of steam is larger in a process in which the steam passes through a group of steam turbines which is a collection of a plurality of steam turbines. In a steam turbine plant, the steam which has been exhausted from a plurality of steam turbines is finally converted into water by a steam condenser and then returns to a boiler. A temperature and a pressure of the steam flowing into the steam condenser are inevitably determined on the basis of a temperature of water or the like used to cool steam using the steam condenser. Steam generated by a high-pressure evaporator has the highest pressure and has an expanded state at a large pressure ratio before the steam has reached the steam condenser, and thus an output can be obtained using the largest energy drop. Therefore, it is very important to improve a flow rate of the steam generated by the high-pressure evaporator in order to improve an output and efficiency of the steam turbine plant. On the other hand, in the high-pressure evaporator, the specific heat of a fluid at a temperature near a high-pressure maximum temperature is large, and a large amount of heat is required to raise the temperature. For this reason, a flow rate of steam which can be generated by the high-pressure evaporator is determined at a quantity of heat of a temperature level near a high-pressure maximum temperature which can be used by the high-pressure evaporator, Therefore, it is very important to input a large amount of heat of a temperature level near the high-pressure maximum temperature to the high-pressure evaporator and to improve a flow rate of steam generated by the high-pressure evaporator in order to improve an output and efficiency of a steam turbine plant. Thus, a quantity of heat of a heated fluid is efficiently used to heat the reheating steam supplied to the second steam turbine, a large amount of heat of the temperature level near the high-pressure maximum temperature is supplied to the high-pressure evaporator, and thus much high temperature steam is supplied to a first steam turbine. As a result, an energy drop of steam in a process in which the steam passes through the group of steam turbines is increased and thus an output obtained from the entire steam turbine group is increased.

In such a steam turbine plant, all the reheaters configured to supply steam to the second steam turbine are disposed only at one side of a downstream side of the high-pressure evaporator and an upstream side in a direction in which the heated fluid flows. Moreover, all the reheaters configured to supply steam to the second steam turbine heat the reheating steam such that a high-pressure maximum temperature which is a specific heat maximum temperature at constant pressure in the high-pressure evaporator is not crossed in a process in which the reheating steam is heated.

To be specific, when all the reheaters configured to supply steam to the second steam turbine are disposed only at the downstream side of the high-pressure evaporator, a temperature of a heated fluid passing through the reheaters is lower than a temperature of a heated fluid passing through the high-pressure evaporator. In addition, in this case, the reheaters heat reheating steam with a temperature lower than the high-pressure maximum temperature to less than the high-pressure maximum temperature such that the high-pressure maximum temperature is not crossed. Thus, in this case, since a quantity of heat of a temperature level near the specific heat maximum temperature at constant pressure in the high-pressure evaporator which is a quantity of heat consumed by the reheaters can be minimized, a large amount of heat of the same temperature level is used by the high-pressure evaporator and thus a flow rate of steam generated by the high-pressure evaporator can be increased. Moreover, a difference between a temperature of steam flowing into the reheaters and a temperature of a heated fluid heating the steam is small, efficiency of heat exchange between the heated fluid and the steam is good, and thus heat of the heated fluid in the reheaters can also be effectively used in view of this.

In addition, in this case, since all the reheaters configured to supply steam to the second steam turbine are disposed only at the downstream side of the high-pressure evaporator, a temperature of the heated fluid passing through the high-pressure evaporator does not decrease due to the presence of the reheaters. For this reason, a large amount of heat of a heated fluid with a high temperature can be supplied to the high-pressure evaporator.

Thus, in this case, much high temperature steam can be supplied to the first steam turbine even when the steam which has been heated by the reheaters is being supplied to the second steam turbine, and thus an output obtained from the entire steam turbine group can be increased.

Also, when all the reheaters configured to supply steam to the second steam turbine are disposed only at the upstream side of the high-pressure evaporator, a temperature of a heated fluid passing through the reheaters is higher than a temperature of a heated fluid passing through the high-pressure evaporator. In this case, the reheaters heat reheating steam with a temperature higher than the high-pressure maximum temperature such that the high-pressure maximum temperature is not crossed. Thus, in this case, since a quantity of heat of a temperature level near the specific heat maximum temperature at constant pressure in the high-pressure evaporator which is a quantity of heat consumed by the reheaters can be minimized, a large amount of heat of the same temperature level is used and thus a flow rate of steam generated by the high-pressure evaporator can be increased. Moreover, a difference between a temperature of steam flowing into the reheaters and a temperature of a heated fluid heating the steam is small, efficiency of heat exchange between the heated fluid and the steam is good, and thus heat of the heated fluid in the reheaters can also be effectively used in view of this.

Thus, also in this case, much high temperature steam can be supplied to the first steam turbine even when the steam which has been heated by the reheaters is being supplied to the second steam turbine and thus an output obtained from the entire steam turbine group can be increased.

Here, in the steam turbine plant, a steam recovery line through which the reheating steam containing all the steam which has passed through e first steam turbine is sent to the reheaters may be connected to all the reheaters configured to supply steam to the second steam turbine.

Also, in any of the above-described steam turbine plants, first reheating steam with a temperature lower than the high-pressure maximum temperature and second reheating steam with a temperature higher than the high-pressure maximum temperature may be used as the reheating steam, a first reheated steam turbine and a second reheated steam turbine may be provided as the second steam turbine, a first reheater disposed only at the downstream side of the high-pressure evaporator and configured to heat the first reheating steam to a temperature less than the high-pressure maximum temperature may be provided as one of the reheaters configured to supply steam to the first reheated steam turbine which is the second steam turbine, and a second reheater disposed only at the upstream side of the high-pressure evaporator and configured to heat the second reheating steam may be provided as one of the reheaters configured to supply steam to the second reheated steam turbine which is the second steam turbine.

In any of the above-described steam turbine plants, the boiler may include a pump configured to change a pressure of water flowing into the high-pressure evaporator to a supercritical pressure higher than a critical pressure.

In such a steam turbine plant, the high-pressure evaporator heats water to a pseudo critical temperature or more in a supercritical pressure. For this reason, in such a steam turbine plant, high-temperature and high-pressure steam can be supplied to a first steam turbine to which steam with the highest pressure is supplied among a plurality of steam turbines. Furthermore, when a pressure of water flowing into the high-pressure evaporator is higher than a critical pressure, a pressure of steam generated by the high-pressure evaporator is also high, the steam has an expanded state particularly at a large pressure ratio before it reaches the steam condenser, and thus an energy drop of the steam turbine is increased. Thus, a temperature rise width in the reheaters is also increased and the consumption of a quantity of heat near the high-pressure maximum temperature in the reheaters is increased. Therefore, the reheaters reheat steam such that the high-pressure maximum temperature is not crossed by applying the present invention so that the consumption of heat of a temperature level near the high-pressure maximum temperature can be minimized and thus a quantity of heat of the same temperature level supplied to the high-pressure evaporator is increased. In this way, a generated steam flow rate of the high-pressure evaporator is increased so that an output from the entire steam turbine group can be increased.

A combined cycle plant serving as an aspect according to the invention for the purpose of accomplishing the above-described objective is a combined cycle plant including: the steam turbine plant according to any one of the above-described steam turbine plants and a gas turbine, wherein the boiler is a waste heat recovery boiler configured to convert an exhaust gas from the gas turbine into a heated fluid.

In such a combined cycle plant, since the steam turbine plant is provided, efficiency of the combined cycle plant can be increased.

A method of operating a steam turbine plant serving as an aspect according to the invention for the purpose of accomplishing the above-described objective is a method of operating a steam turbine plant which includes a boiler configured to heat water using a heated fluid to generate steam, and a steam turbine driven using the steam from the boiler, in which the boiler includes one or more evaporators configured to heat water which has flowed therein to a specific heat maximum temperature at constant pressure or more in which a specific heat at constant pressure is maximized using the heated fluid and to convert the water into steam and one or more reheaters configured to heat the steam which has come from the boiler using the heated fluid, and a first steam turbine configured to receive steam supplied from a high-pressure evaporator into which water with the highest pressure flows among the one or more evaporators and a second steam turbine to which the steam which has been heated by the one or more reheaters is supplied are provided as the steam turbine, wherein: all the reheaters configured to supply steam to the second steam turbine are disposed only at one side of a downstream side and an upstream side of the high-pressure evaporator in a direction in which the heated fluid flows, when all the reheaters are disposed only at the downstream side, all the reheaters heat reheating steam at least containing steam which has passed through the first steam turbine and having a temperature lower than a high-pressure maximum temperature which is the specific heat maximum temperature at constant pressure in the high-pressure evaporator to less than the high-pressure maximum temperature, and when all the reheaters are disposed only at the upstream side, all the reheaters heat heating steam at least containing steam which has passed through the first steam turbine and having a temperature higher than the high-pressure maximum temperature.

Also in the method of operating the steam turbine plant, like in the above-described steam turbine plant, much high temperature steam can be supplied to the first steam turbine even when the steam which has been heated by the reheaters is being supplied to the second steam turbine and thus an output obtained from the entire steam turbine group can be increased.

Here, in the method of operating the steam turbine plant, the reheating steam containing all the steam which has passed through the first steam turbine may be supplied to all the reheaters configured to supply steam to the second steam turbine.

Also, in any of the above-described methods of operating the steam turbine plant, water with a temperature less than a pseudo critical temperature at a supercritical pressure may be supplied to the high-pressure evaporator and the water may be heated to a temperature higher than the pseudo critical temperature.

In an aspect of the present invention, much high temperature steam can be supplied to the first steam turbine even when the steam which has been heated by the reheaters is being supplied to the second steam turbine. Thus, according to an aspect of the present invention, an output obtained from the entire steam turbine group can be increased and thus efficiency of a steam turbine plant can be increased.

DETAILED DESCRIPTION OF THE INVENTION

Various embodiments and modified examples of a steam turbine plant according to the present invention will be described below with reference to the drawings.

"First Embodiment of Steam Turbine Plant"

First, a first embodiment of a steam turbine plant according to the present invention will be described with reference to FIGS. 1 to 3.

Figure 1:
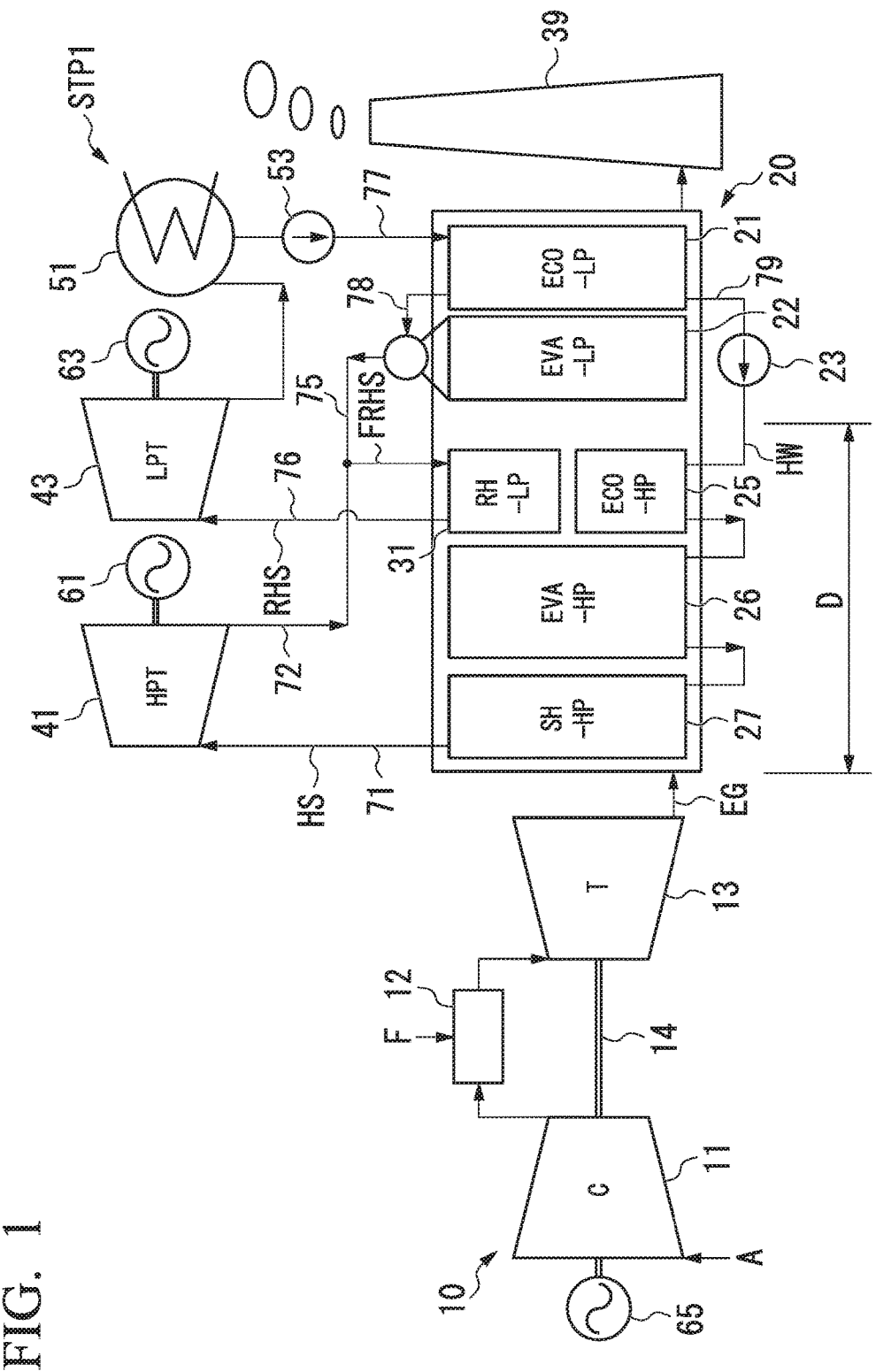
FIG. 1 is a system diagram of a steam turbine plant in a first embodiment according to the present invention.

As shown in FIG. 1, a steam turbine plant STP1 in this embodiment includes a waste heat recovery boiler 20 configured to generate steam using heat of an exhaust gas EG (a heated fluid) from a gas turbine 10, steam turbines 41 and 43 driven using the steam which has been generated by a waste heat recovery boiler 20, generators 61 and 63 configured to generate electricity using driving of the steam turbines 41 and 43, a steam condenser 51 configured to convert steam used to drive the steam turbines 41 and 43 into water, a water supply pump 53 configured to return water in the steam condenser 51 to a waste heat recovery boiler 20, and a chimney 39 configured to discharge the exhaust gas EG which has passed through the waste heat recovery boiler 20 to the atmosphere. Note that, here, a combined cycle plant is constituted of the gas turbine 10 and the steam turbine plant STP1.

The gas turbine 10 includes a compressor configured to compress air, a plurality of combustors 12 configured to burn a fuel F in the air compressed by the compressor 11 to generate a combustion gas, and a turbine 13 driven using a high-temperature and high-pressure combustion gas. Since a turbine rotor of the turbine 13 and a compressor rotor of the compressor 11 rotate about the same axis, the turbine rotor thereof and the compressor rotor thereof are coupled to each other so that a gas turbine rotor 14 is constituted. For example, a generator rotor of a generator 65 is connected to the gas turbine rotor 14. A combustion gas which has been exhausted from the turbine 13 is supplied to the waste heat recovery boiler 20 as an exhaust gas EG.

The steam turbine plant STP1 in this embodiment includes the high-pressure steam turbine 41 (a first steam turbine) and the low-pressure steam turbine 43 (a second steam turbine) as steam turbines. Rotors of the generators 61 and 63 are connected to a turbine rotor of the high-pressure steam turbine 41 and a turbine rotor of the low-pressure steam turbine 43.

The waste heat recovery boiler 20 includes a low-pressure economizer (ECO-LP) 21 configured to heat water sent using a water supply pump 53, a low-pressure evaporator (EVA-LP) 22 configured to convert the water which has been heated by the low-pressure economizer 21 into steam, a high-pressure pump 23 configured to increase a pressure of the water which has been heated by the low-pressure economizer 21, a high-pressure economizer (ECO-HP) 25 configured to heat high-pressure water HW which is the water with the pressure increased by the high-pressure pump 23, a high-pressure evaporator (EVA-HP) 26 configured to convert the high-pressure water HW which has been heated by the high-pressure economizer 25 into steam, a high-pressure superheater (SH-HP) 27 configured to superheat the steam which has been generated by the high-pressure evaporator 26 and to generate high-pressure steam HS, and a reheater (RH-LP) 31 configured to heat reheating steam FRHS containing the high-pressure steam which has been exhausted from the high-pressure steam turbine 41.

Here, in the case of a direction in which an exhaust gas EG flowing through the waste heat recovery boiler 20 flows, a side at which the chimney 39 is present is set as a downstream side and a side opposite thereto is set as an upstream side of the gas turbine 10. The low-pressure economizer 21, the low-pressure evaporator 22, the reheater 31, the high-pressure economizer 25, the high-pressure evaporator 26, and the high-pressure superheater 27 are arranged in this order from the downstream side toward the upstream of the waste heat recovery boiler 20. Note that, in this embodiment, a position of the reheater 31 and a position of the high-pressure economizer 25 in the direction in which the exhaust gas EG flows are substantially the same.

The steam condenser 51 and the low-pressure economizer 21 are connected using a water supply line 77. The above-described water supply pump 53 is provided at the water supply line 77. A first low-pressure water line 78 through which the water which has been heated by the low-pressure economizer 21 is sent to the low-pressure evaporator 22 and a second low-pressure water line 79 through which the water which has been heated by the low-pressure economizer 21 is sent to the high-pressure economizer 25 are connected to the low-pressure economizer 21. The above-described high-pressure pump 23 is provided at the second low-pressure water line 79. A steam outlet in the high-pressure superheater 27 and a steam inlet in the high-pressure steam turbine 41 are connected using a high-pressure steam supply line 71 through which high-pressure steam HS which is steam which has been superheated by the high-pressure superheater 27 is supplied to the high-pressure steam turbine 41. Furthermore, a steam outlet in the high-pressure steam turbine 41 and a steam inlet in the reheater 31 are connected using a high-pressure steam recovery line 72. A low-pressure steam line 75 through which steam which has been generated by the low-pressure evaporator 22 is sent to the reheater 31 is connected to the high-pressure steam recovery line 72. A steam outlet in the reheater 31 and a steam inlet in the low-pressure steam turbine 43 are connected using a reheated steam supply line 76 through which reheated steam RHS which is the steam which has been heated by the reheater 31 is supplied to the low-pressure steam turbine 43. A steam outlet in the low-pressure steam turbine 43 and the steam condenser 51 are connected to each other such that the steam which has been exhausted from the low-pressure steam turbine 43 is supplied to the steam condenser 51.

Next, an operation of the above-described combined cycle plant will be described.

The compressor 11 in the gas turbine 10 compresses air A in the atmosphere and supplies the compressed air A to the combustors 12. Furthermore, a fuel F from a fuel supply source is also supplied to the combustors 12. In the combustors 12, the fuel F is burnt in the compressed air A and a high-temperature and high-pressure combustion gas is generated. Such a combustion gas is sent into the turbine 13 to rotate the turbine rotor in the turbine 13. The generator 65 connected to the gas turbine 10 generates electricity using rotation of the turbine rotor.

The combustion gas which has rotated the turbine rotor in the turbine 13 is exhausted from the gas turbine 10 as an exhaust gas EG The exhaust gas EG passes through the waste heat recovery boiler 20 and is discharged from the chimney 39 to the atmosphere. The waste heat recovery boiler 20 converts water into steam using heat of the exhaust gas EG.

Water from the steam condenser 51 is supplied to the low-pressure economizer 21 located furthest downstream in the waste heat recovery boiler 20 via the water supply line 77. The low-pressure economizer 21 heats the water by exchanging heat with the exhaust gas EG. A portion of the water which has been heated by the low-pressure economizer 21 is sent to the low-pressure evaporator 22 via the first low-pressure water line 78, is further heated in the low-pressure evaporator 22, and is converted into steam. The steam is sent to the reheater 31 via the low-pressure steam line 75 and the high-pressure steam recovery line. Furthermore, a pressure of the remaining water which has been heated by the low-pressure economizer 21 is increased by the high-pressure pump 23 and the remaining water is sent to the high-pressure economizer 25 as high-pressure water HW. The high-pressure economizer 25 heats the high-pressure water HW by exchanging heat with the exhaust gas EG. The high-pressure water HW which has been heated by the high-pressure economizer 25 is further heated by the high-pressure evaporator 26 and is converted into steam. The steam is further superheated by the high-pressure superheater 27 and is converted into high-pressure steam HS. The high-pressure steam HS is supplied to the high-pressure steam turbine 41 (the first steam turbine) via the high-pressure steam supply line 71.

The high-pressure steam HS supplied to the high-pressure steam turbine 41 rotates the turbine rotor in the high-pressure steam turbine 41. The generator 61 connected to the high-pressure steam turbine 41 generates electricity using rotation of the turbine rotor. The high-pressure steam which has passed through the high-pressure steam turbine 41 (the first steam turbine) is sent to the reheater 31 via the high-pressure steam recovery line 72. Furthermore, steam which has been generated by the low-pressure evaporator 22 is also sent to the reheater 31 via the low-pressure steam line 75 and the high-pressure steam recovery line 72 as described above. In other words, the high-pressure steam which has passed through the high-pressure steam turbine 41 joins the steam which has been generated by the low-pressure evaporator 22 and the joined steam flows into the reheater 31 as reheating steam FRHS. The reheating steam FRHS is heated by the reheater 31. The reheating steam FRHS which has been heated by the reheater 31 is supplied to the low-pressure steam turbine 43 (the second steam turbine) via the reheated steam supply line 76 as reheated steam RHS.

The reheated steam RHS supplied to the low-pressure steam turbine 43 rotates the turbine rotor in the low-pressure steam turbine 43. The generator 63 connected to the low-pressure steam turbine 43 generates electricity using rotation of the turbine rotor. The reheated steam which has passed through the low-pressure steam turbine 43 flows into the steam condenser 51 and is converted into water by the steam condenser 51. Water in the steam condenser 51 is supplied to the low-pressure economizer 21 using the water supply pump 53 as described above.

Figure 9:
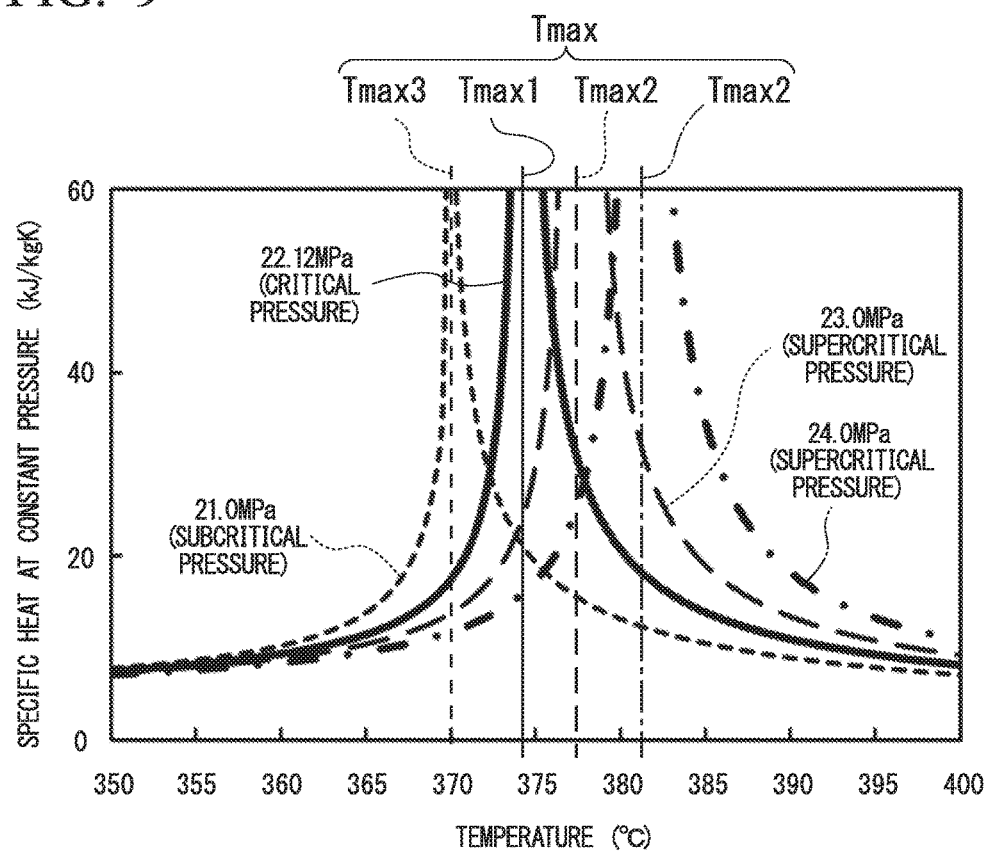
FIG. 9 is a graph showing a relationship between a temperature and a specific heat at constant pressure of water.

Here, the high-pressure evaporator 26 in this embodiment is an apparatus configured to heat water with a temperature of a specific heat maximum temperature at constant pressure Tmax or less at which a specific heat at constant pressure at a predetermined pressure is maximized to a temperature of the specific heat maximum temperature at constant pressure Tmax or more, which is illustrated in FIG. 9. To be specific, when a pressure of water heated by the high-pressure evaporator 26 is a critical pressure, the high-pressure evaporator 26 is an apparatus configured to heat water with a temperature at which a specific heat at constant pressure is maximized at the critical pressure, that is, a temperature of a critical temperature Tmax1 (the specific heat maximum temperature at constant pressure Tmax) or less to a temperature of the critical temperature Tmax1 or more. When a pressure of water heated by the high-pressure evaporator 26 is higher than a critical pressure, the high-pressure evaporator 26 is an apparatus configured to heat water with a temperature at which a specific heat at constant pressure is maximized at a pressure of the water heated by the high-pressure evaporator 26, that is, a temperature of a pseudo critical temperature Tmax2 (the specific heat maximum temperature at constant pressure T or less to the temperature of the pseudo critical temperature Tmax2 or more. When a pressure of water heated by the high-pressure evaporator 26 is lower than a critical pressure, the high-pressure evaporator 26 is an apparatus configured to heat water with a temperature at which a specific heat at constant pressure is maximized at a pressure of the water heated by the high-pressure evaporator 26, that is, a temperature of a saturation temperature Tmax3 (the specific heat maximum temperature at constant pressure Tmax) or less, to the saturation temperature Tmax3 or more. Thus, in the foregoing and following descriptions, steam generated by the high-pressure evaporator 26 is a fluid in which water with a temperature of a critical temperature Tmax1 or less has a temperature of a critical temperature Tmax1 or more at a critical pressure, a fluid in which water with the temperature of the pseudo critical temperature Tmax2 or less has the temperature of the pseudo critical temperature Tmax2 or more at a supercritical pressure, or a fluid in which water with a temperature of a saturation temperature Tmax3 or less has a temperature of a saturation temperature Tmax3 or more at a subcritical pressure. Furthermore, the high-pressure pump 23 is a pump configured to increase a pressure of the water which has been heated by the low-pressure economizer 21 to a critical pressure, a supercritical pressure, and a subcritical pressure. Note that the pseudo critical temperature Tmax2 and the saturation temperature Tmax3 illustrated in FIG. 9 are merely examples and the pseudo critical temperature Tmax2 and the saturation temperature Tmax3 are changed in accordance with a pressure of water heated by the high-pressure evaporator 26. Furthermore, here, cases including a case in which a specific heat at constant pressure is infinite as well are referred to as a maximum.

Also, reheating steam FRHS with a temperature lower than the specific heat maximum temperature at constant pressure Tmax (a high-pressure maximum temperature Tmax-HP) in a high-pressure evaporator 26 with the highest pressure of inflow water among a plurality of evaporators 22 and 26 included in the waste heat recovery boiler 20 flows into the reheater 31 in this embodiment. In other words, when water with a critical pressure is supplied to the high-pressure evaporator 26, reheating steam FRHS with a temperature lower than a critical temperature Tmax1 flows into the reheater 31. Furthermore, when water with a supercritical pressure is supplied to the high-pressure evaporator 26, reheating steam FRHS with a temperature lower than the pseudo critical temperature Tmax2 at a pressure of water supplied to the high-pressure evaporator 26 flows into the reheater 31. Furthermore, when water with a subcritical pressure is supplied to the high-pressure evaporator 26, reheating steam FRHS with a temperature lower than a saturation temperature Tmax3 at the pressure of the water supplied to the high-pressure evaporator 6 flows into the reheater 31. The reheater 31 heats such reheating steam FRHS to a temperature less than the specific heat maximum temperature at constant pressure Tmax (the high-pressure maximum temperature Tmax-HP). Thus, with regard to a temperature of an exhaust gas EG passing through the reheater 31 and a temperature and a flow rate of steam flowing into the reheater 31, the reheater 31 is set to have a heat transfer area such that a temperature of steam flowing out of the reheater 31 is increased to less than the specific heat maximum temperature at constant pressure Tmax (the high-pressure maximum temperature Tmax-HP).

Figure 2:
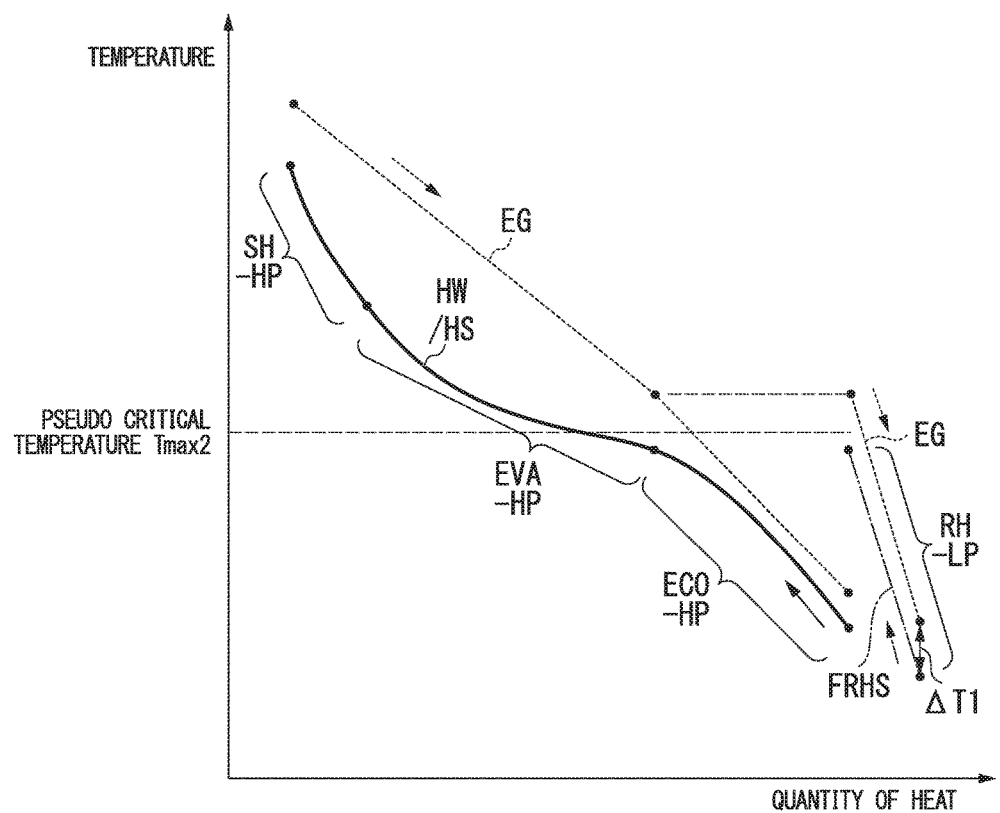
FIG. 2 is a TQ diagram showing a relationship between a quantity of heat and a temperature along with flows of an exhaust gas and water (containing steam) in a boiler in a first embodiment according to the present invention.
Figure 3:
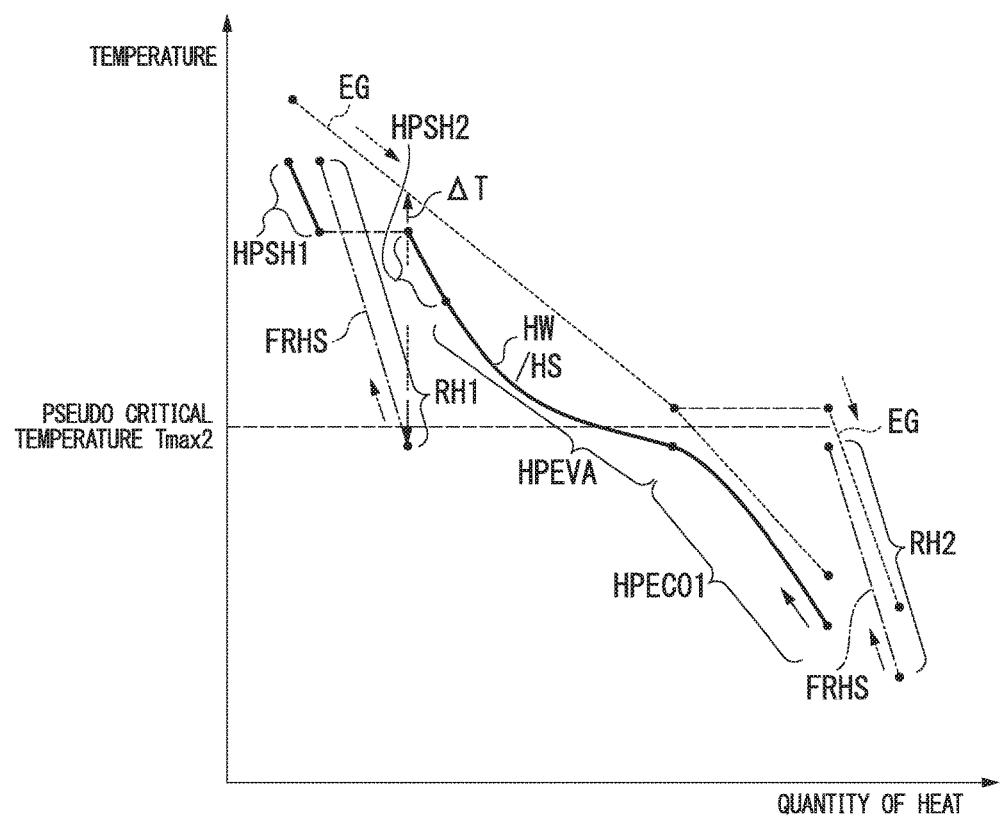
FIG. 3 is a TQ diagram showing a relationship between a quantity of heat and a temperature along with flows of an exhaust gas and water (containing steam) in a boiler in a comparative example.

FIG. 2 is a TQ diagram showing a relationship between a quantity of heat and a temperature along with flows of an exhaust gas EG and water (containing steam) HW/HS in this embodiment. The TQ diagram is a TQ diagram of an interval D from the high-pressure superheater (SH-HP) 27 located furthest upstream in the direction in which the exhaust gas EG flows to the reheater (RH-LP) 31 and the high-pressure economizer (ECO-HP) 25 in the waste heat recovery boiler 20 as shown in FIG. 1. Furthermore, in FIG. 2, a solid line indicates a TQ line of water (containing steam) HW/HS supplied to the high-pressure steam turbine 41, a dotted line indicates a TQ line of an exhaust gas EG, and a one-dot chain line indicates a TQ line of reheating steam FRHS. Note that the TQ diagram does not quantitatively represent a relationship between a quantity of heat and a temperature along with flows of an exhaust gas EG and water (containing steam), but qualitatively represents the relationship therebetween. Furthermore, FIG. 2 illustrates a case in which water heated by the high-pressure evaporator 26 has a supercritical pressure as an example.

A temperature of the exhaust gas EG gradually decreases as it flows downstream, and a quantity of heat thereof is decreased. On the other hand, a temperature of water (containing steam) HW/HS supplied to the high-pressure steam turbine 41 gradually increases as it flows upstream due to heat exchange with the exhaust gas EG and a quantity of heat thereof is increased. To be specific, a temperature of high-pressure water HS flowing into the high-pressure economizer (ECO-HP) 25 gradually increases in a process in which it passes through the high-pressure economizer (ECO-HP) 25 and a quantity of heat is increased. In the high-pressure economizer (ECO-HP) 25, the high-pressure water HS is heated to a temperature lower than the pseudo critical temperature Tmax2. A temperature of water flowing out of the high-pressure economizer (ECO-HP) 25 and flowing into the high-pressure evaporator (EVA-HP) 26 disposed further upstream than the high-pressure economizer (ECO-HP) 25 also gradually increases in a process in which it passes through the high-pressure evaporator (EVA-HP) 26, and a quantity of heat thereof is increased. In the high-pressure evaporator (EVA-HP) 26, the water is heated from a temperature lower than the pseudo critical temperature Tmax2 to a temperature higher than the pseudo critical temperature Tmax2 and is converted into steam. A temperature change of water or steam HW/HS with respect to a change in heat quantity is small at about the pseudo critical temperature Tmax2 and is large at temperatures near that temperature. A temperature of steam flowing out of the high-pressure evaporator (EVA-HP) 26 and flowing into the high-pressure superheater (SH-HP) 27 disposed further upstream than the high-pressure evaporator (EVA-HP) 26 also gradually increases in a process in which it passes through the high-pressure superheater (SH-HP) 27, a quantity of heat thereof is increased, and thus the steam is converted into high-pressure steam HS. The high-pressure steam HS is supplied to the high-pressure steam turbine 41.

Reheating steam FRHS with a temperature lower than a pseudo critical temperature Tmax2 (in the case of the supercritical pressure) flows into the reheater (RH-LP) 31 as described above. Furthermore, an exhaust gas EG with the same temperature as an exhaust gas EG passing through the high-pressure economizer (ECO-HP) 25 disposed at substantially the same position as the reheater (RH-LP) 31 in the direction in which the exhaust gas EG flows passes through the reheater (RH-LP) 31. A temperature of the reheating steam FRHS gradually increases in a process in which it passes through the reheater (RH-LP) 31 due to heat exchange with the exhaust gas EG and a quantity of heat is increased. Here, the reheating steam FRHS is heated only to a temperature less than the pseudo critical temperature Tmax2 (in the case of the supercritical pressure) as described above. Therefore, the consumption of heat of a temperature level at about the pseudo critical temperature Tmax2 (in the case of the supercritical pressure) in the reheater (RH-LP) 31 is minimized and thus a quantity of heat used in the high-pressure evaporator (EVA-HP) 26 can be increased. The reheating steam FRHS is supplied to the low-pressure steam turbine 43 as reheated steam RHS when heated by the reheater (RH-LP) 31.

Here, with the steam turbine plant mentioned in "Description of Related Art" described above as Comparative Example, a relationship between a quantity of heat and a temperature along with flows of an exhaust gas EG and water (containing steam) HW/HS in Comparative Example will be described using a TQ diagram in FIG. 3. The TQ diagram does not quantitatively represent a relationship between a quantity of heat and a temperature along with flows of an exhaust gas EG and water (containing steam) HW/HS, but qualitatively represents the relationship therebetween like in the TQ diagram in FIG. 2.

Also in the steam turbine plant in Comparative Example, a temperature of an exhaust gas EG (indicated by a dotted line) gradually decreases as it flows downstream, and a quantity of heat thereof is decreased. On the other hand, a temperature of water (containing steam) HW/HS supplied to a high-pressure steam turbine gradually increases as it flows upstream due to heat exchange with the exhaust gas EG, and a quantity of heat thereof is increased. To be specific, a temperature of water flowing into a high-pressure economizer (HPECO1) at the downstream side gradually increases as it flows toward the high-pressure economizer (HPECO1), a high-pressure evaporator (HPEVA), a downstream high-pressure superheater (HPSH2), an upstream high-pressure superheater (HPSH1) and the upstream side, and a quantity of heat thereof is increased. Water (containing steam) HW/HS supplied to a high-pressure steam turbine is heated from a temperature lower than the pseudo critical temperature Tmax2 to a temperature higher than the pseudo critical temperature Tmax2 in a process in which it passes through the high-pressure evaporator (HPEVA).

The steam FRITS which has been exhausted from an intermediate-pressure steam turbine flows into a downstream reheater (RH2). The steam FRHS exchanges heat with an exhaust gas EG and thus a temperature thereof gradually increases in a process in which it passes through the downstream reheater (RH2), and a quantity of heat thereof is increased. The steam FRHS is heated from a temperature lower than a critical temperature to a temperature lower than the pseudo critical temperature Tmax2 by the downstream reheater (RH2). The steam FRHS which has been heated by the downstream reheater (RH2) exchanges heat with the exhaust gas EG and thus a temperature thereof gradually increases in a process in which it passes through an upstream reheater (RH1), and a quantity of heat thereof is increased. The steam FRHS is heated to a temperature higher than the pseudo critical temperature Tmax2 by the upstream reheater (RH1). The steam FRHS which has been heated to the temperature higher than pseudo critical temperature Tmax2 is supplied to a low-pressure steam turbine as reheated steam. In other words, reheated steam RHS which has been heated from the temperature lower than a critical temperature to the temperature higher than the pseudo critical temperature Tmax2 by the downstream reheater (RH2) and the upstream reheater (RH1) is supplied to the low-pressure steam turbine in Comparative Example.

As described above, in the steam turbine plant in Comparative Example, a group of reheaters constituted of the downstream reheater (RH2) and the upstream reheater (RH1), both of which are reheaters configured to supply steam to the low-pressure steam turbine, heats steam FRHS with a temperature lower than the pseudo critical temperature Tmax2 to a temperature higher than the pseudo critical temperature Tmax2. Thus, a difference between a temperature of the steam FRHS flowing into the group of reheaters and a temperature of the steam FRHS flowing out of the group of reheaters in Comparative Example is large, and heat quantity consumption of a temperature level near the pseudo critical temperature Tmax2 is large. Therefore, a quantity of heat of the same temperature level which can be used by the high-pressure evaporator (HPEVA) is small and a steam flow rate which can be generated in the high-pressure evaporator (HPEVA) is low. Moreover, steam is steam in which a temperature of steam FRHS flowing into the upstream reheater (RH1) in the group of reheaters is lower than the pseudo critical temperature Tmax2. On the other hand, a temperature of an exhaust gas EG heating steam inside the upstream reheater (RH1) is a temperature higher than the pseudo critical temperature Tmax2 because the upstream reheater (RH1) is disposed at the upstream side of the high-pressure evaporator (HPEVA). For this reason, in Comparative Example, a difference ΔT between a temperature of the steam FRHS flowing into the upstream reheater (RH1) in the group of reheaters and a temperature of the exhaust gas EG heating the steam FRHS is large. For this reason, efficiency of heat exchange between the exhaust gas EG and the steam HMS is low and heat quantity consumption of the exhaust gas EG in the group of reheaters in terms of this is large.

In addition, since the upstream reheater (RH1) in which the efficiency of the heat exchange between the exhaust gas EG and the steam FRHS is low and the heat quantity consumption of the exhaust gas EG is large is disposed further upstream than the high-pressure evaporator (HPEVA) in Comparative Example, a temperature of the exhaust gas EG is low when it has reached the high-pressure evaporator (HPEVA) via the upstream reheater (RH1).

Generally, an output obtained from the entire steam turbine group is larger when an energy drop of steam is larger in a process in which the steam passes through a group of steam turbines which is a collection of a plurality of steam turbines. In a steam turbine plant, the steam which has been exhausted from a plurality of steam turbines is finally converted into water by a steam condenser and then returns to a boiler. A temperature and a pressure of the steam flowing into the steam condenser are inevitably determined on the basis of a temperature of water or the like used to cool steam using the steam condenser. Steam generated by a high-pressure evaporator has the highest pressure and has an expanded state at a large pressure ratio before the steam has reached the steam condenser, and thus an output can be obtained at the largest energy drop. Therefore, it is very important to improve a flow rate of the steam generated by the high-pressure evaporator in order to improve an output and efficiency of the steam turbine plant. On the other hand, in the high-pressure evaporator, the specific heat of a fluid at a temperature near a high-pressure maximum temperature is large, and a large amount of heat is required to raise the temperature. For this reason, a flow rate of steam which can be generated by the high-pressure evaporator is determined at a quantity of heat of a temperature level near a high-pressure maximum temperature which can be used by the high-pressure evaporator. Therefore, it is very important to input a large amount of heat of a temperature level near the high-pressure maximum temperature to the high-pressure evaporator and to improve a flow rate of steam generated by the high-pressure evaporator in order to improve an output and efficiency of a steam turbine plant.

Thus, in this embodiment, a quantity of heat of a heated fluid is efficiently used to heat reheating steam supplied to the low-pressure steam turbine 43 (the second steam turbine), a large amount of heat of a temperature level near the high-pressure maximum temperature is supplied to the high-pressure evaporator 26, and much high temperature steam is supplied to the high-pressure steam turbine 41 (the first steam turbine). As a result, an energy drop of steam in a process in which the steam passes through a group of steam turbines is large, and an output obtained from the entire steam turbine group is increased.

In the steam turbine plant STP1 in this embodiment, all reheaters 31 (one reheater 31 in this embodiment) configured to supply reheated steam RHS to the low-pressure steam turbine 43 (the second steam turbine) are disposed only at the downstream side of the high-pressure evaporator 26 in the direction in which the exhaust gas EG (the heated fluid) flows. Moreover, in all of the reheaters 31 configured to supply reheated steam RHS to the low-pressure steam turbine 43, reheating steam FRHS is heated not to cross a high-pressure maximum temperature Tmax-HP which is the specific heat maximum temperature at constant pressure Tmax in the high-pressure evaporator 26 in a process in which the reheating steam FRHS is heated.

To be specific, in this embodiment, a temperature of an exhaust gas EG passing through all of the reheaters 31 configured to supply reheated steam RHS to the low-pressure steam turbine 43 is lower than a temperature of an exhaust gas EG passing through the high-pressure evaporator 26. Furthermore, reheating steam FRHS with a temperature lower than the high-pressure maximum temperature Tmax-HP (the critical temperature Tmax1 (in the case of the critical pressure), the pseudo critical temperature Tmax2 (in the case of the supercritical pressure), and the saturation temperature Tmax3 (in the case of the subcritical pressure)) flows into the reheater 31 in this embodiment. The reheater 31 in this embodiment heats reheating steam FRHS with a temperature lower than the high-pressure maximum temperature Tmax-HP to less than the high-pressure maximum temperature Tmax-HP such that the high-pressure maximum temperature Tmax-HP is not crossed. Thus, since a quantity of heat of a temperature level near the high-pressure maximum temperature Tmax-HP in the high-pressure evaporator 26 which is a quantity of heat consumed by the reheater can be minimized in this embodiment, a large amount of heat of the same temperature level is used by the high-pressure evaporator 26 and thus a flow rate of steam generated by the high-pressure evaporator 26 can be increased. Moreover, as shown in FIG. 2, a difference $\Delta T1$ between a temperature of reheating steam FRHS flowing into the reheater (RH-LP) 31 and a temperature of an exhaust gas EG heating the reheating steam FRHS is lower than a temperature difference $\Delta T$ (refer to FIG. 3) in the upstream reheater (RH1) in Comparative Example, efficiency of heat exchange between an exhaust gas EG and reheating steam FRHS is good, and thus heat of the exhaust gas EG in the reheater 31 can also be effectively used in view of this.

In addition, since the reheater 31 configured to supply steam to the low-pressure steam turbine 43 is disposed only at the downstream side of the high-pressure evaporator 26 in this embodiment, a temperature of an exhaust gas (a heated fluid) passing through the high-pressure evaporator 26 does not decrease due to the presence of the reheater 31. For this reason, in this embodiment, an exhaust gas with a higher temperature than in Comparative Example can be caused to pass through the high-pressure evaporator 26.

Thus, in this embodiment, much high temperature steam can be efficiently supplied to the high-pressure steam turbine 41 even when steam which has been heated by the reheater 31 is being supplied to the low-pressure steam turbine 43, and thus an output obtained from the entire steam turbine group can be increased. For this reason, in this embodiment, efficiency of a steam turbine plant can be increased.

"Second Embodiment of Steam Turbine Plant"

Next, a second embodiment of a steam turbine play t according to the present invention will be described with reference to FIGS. 4 and 5.

Figure 4:
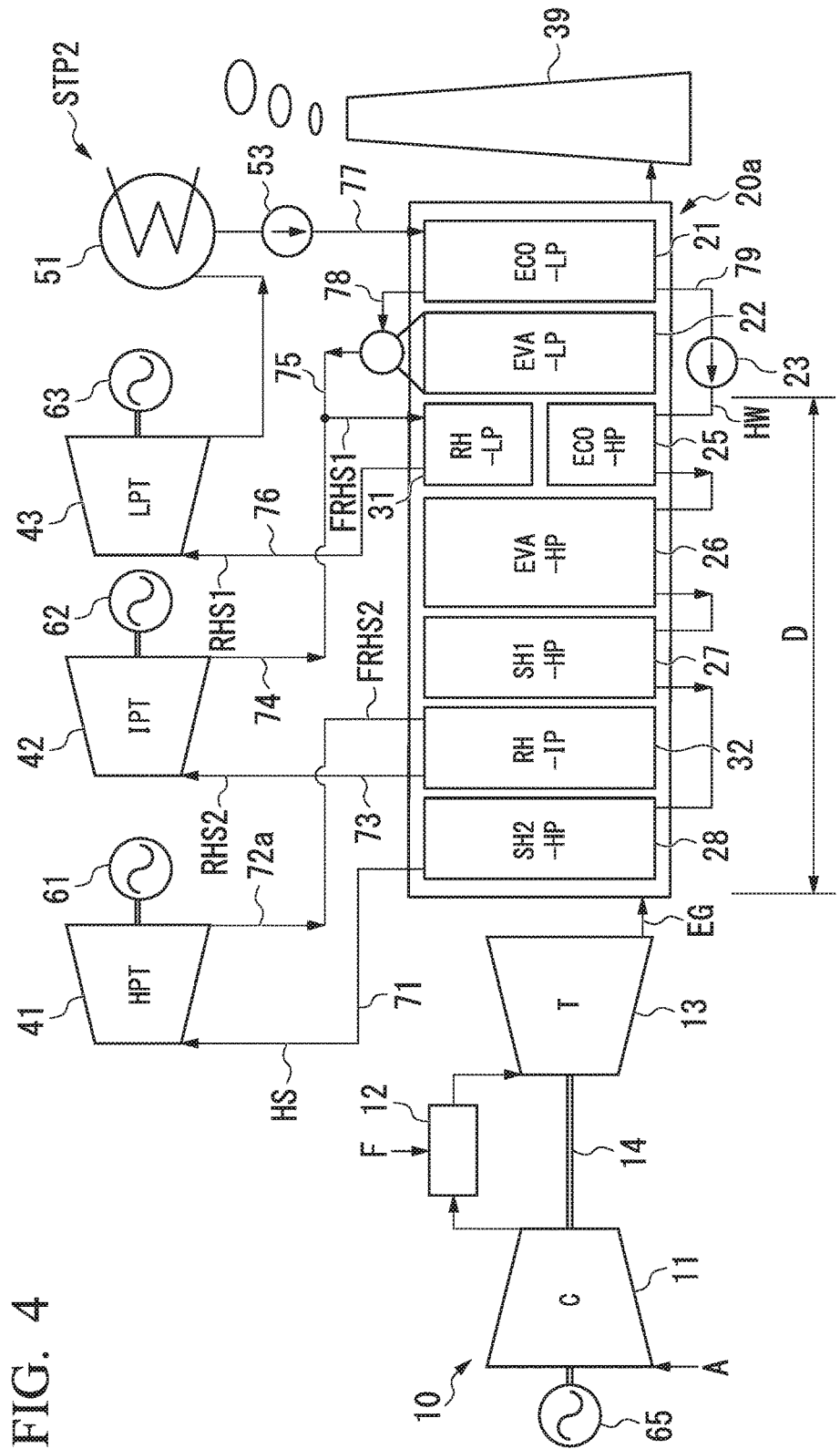
FIG. 4 is a system diagram of a steam turbine plant in a second embodiment according to the present invention.
Figure 5:
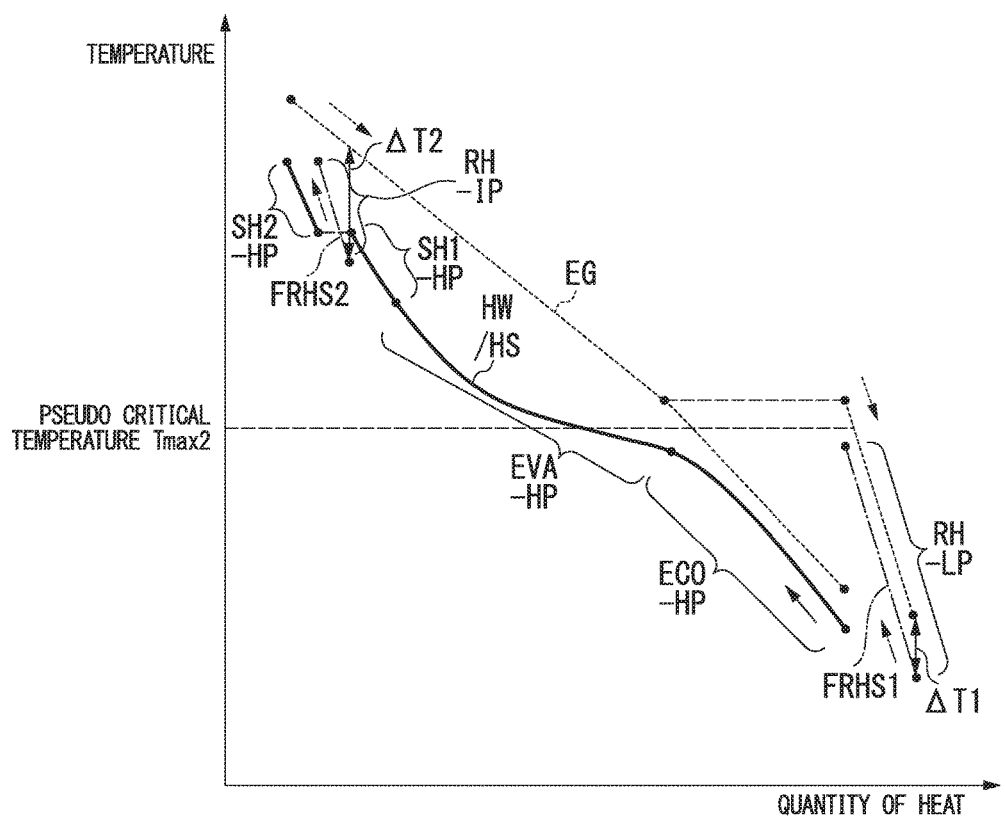
FIG. 5 is a TQ diagram showing a relationship between a quantity of heat and a temperature along with flows of an exhaust gas and water (containing steam) in a boiler in the second embodiment according to the present invention.

A steam turbine plant STP2 in this embodiment also includes a waste heat recovery boiler 20a, steam turbines 41, 42, and 43, generators 61, 62, and 63, a steam condenser 51, a water supply pump 53, and a chimney 39, as shown in FIG. 4, like the first embodiment. Note that, also in this embodiment, like the first embodiment, a combined cycle plant is constituted of a gas turbine 10 and the steam turbine plant STP2.

The steam turbine plant STP2 in this embodiment includes a high-pressure steam turbine 41 (a first steam turbine), an intermediate-pressure steam bine 42 (a second steam turbine and a second reheated steam turbine), and a low-pressure steam turbine 43 (the second steam turbine and a first reheated steam turbine) as steam turbines. Rotors in the generators 61, 62, and 63 are connected to a turbine rotor in the high-pressure steam turbine 41, a turbine rotor in the intermediate-pressure steam turbine 42, and a turbine rotor in the low-pressure steam turbine 43, respectively.

The waste heat recovery boiler 20a includes a low-pressure economizer (ECO-LP) 21 configured to heat water sent using the water supply pump 53, a low-pressure evaporator (EVA-LP) 22 configured to convert the water which has been heated by the low-pressure economizer 21 into steam, a high-pressure pump 23 configured to increase a pressure of the water which has been heated by the low-pressure economizer 21, a high-pressure economizer (ECO-HP) 25 configured to heat high-pressure water HW which is the water with the pressure increased by the high-pressure pump 23, a high-pressure evaporator (EVA-HP) 26 configured to convert the high-pressure water which has been heated by the high-pressure economizer 25 into steam, a first high-pressure superheater (SH1-HP) 27 configured to superheat the steam which has been generated by the high-pressure evaporator 26, a second high-pressure superheater (SH2-HP) 28 configured to further superheat the steam which has been superheated by the first high-pressure superheater 27 and to convert the steam into high-pressure steam HS, an intermediate reheater (RH-IP) 32 configured to heat steam which has been exhausted from the high-pressure steam turbine 41 as reheating intermediate-pressure steam FRHS2 (second reheating steam), and a low-pressure reheater (RH-LP) 31 configured to heat reheating low-pressure steam FRHS1 (first reheating steam) containing steam which has been exhausted from the intermediate-pressure steam turbine 42.

The low-pressure economizer 21, the low-pressure evaporator 22, the low-pressure reheater 31, the high-pressure economizer 25, the high-pressure evaporator 26, the first high-pressure superheater 27, the intermediate reheater 32, and the second high-pressure superheater 28 are disposed in this order from the downstream side toward the upstream side of the waste heat recovery boiler 20a. Note that, in this embodiment, a position of the low-pressure reheater 31 and a position of the high-pressure economizer 25 in the direction in which the exhaust gas EG flows are substantially the same.

A steam outlet in the second high-pressure superheater 28 and a steam inlet in the high-pressure steam turbine 41 are connected using a high-pressure steam supply line 71 through which high-pressure steam HS which is the steam which has been superheated by the second high-pressure superheater 28 is supplied to the high-pressure steam turbine 41. Furthermore, the steam outlet in the high-pressure steam turbine 41 and a steam inlet in the intermediate reheater 32 are connected using a high-pressure steam recovery line 72a. A steam outlet in the intermediate reheater 32 and a steam inlet in the intermediate-pressure steam turbine 42 are connected using a reheated intermediate-pressure steam supply line 73 through which reheated intermediate-pressure steam RHS2 which is the steam which has been heated by the intermediate reheater 32 is supplied to the intermediate-pressure steam turbine 42. A steam outlet in the intermediate-pressure steam turbine 42 and the steam inlet in the low-pressure reheater 31 are connected using an intermediate-pressure steam recovery line 74. A low-pressure steam line 75 configured to send the steam which has been generated by the low-pressure evaporator 22 to the low-pressure reheater 31 is connected to the intermediate-pressure steam recovery line 74. The steam outlet in the low-pressure reheater 31 and the steam inlet in the low-pressure steam turbine 43 are connected using a reheated low-pressure steam supply line 76 through which reheated low-pressure steam RHS1 which is the steam which has been heated by the low-pressure reheater 31 is supplied to the low-pressure steam turbine 43. The steam outlet in the low-pressure steam turbine 43 and the steam condenser 51 are connected to each other such that steam which has been exhausted from the low-pressure steam turbine 43 is supplied to the steam condenser 51.

The high-pressure evaporator 26 in this embodiment is also an apparatus configured to heat water with a temperature lower than a specific heat maximum temperature at constant pressure Tmax (a critical temperature Tmax1 (in the case of a critical pressure), a pseudo critical temperature Tmax2 (in the case of a supercritical pressure), and a saturation temperature Tmax3 (in the case of a subcritical pressure)) at which a specific heat at constant pressure at a predetermined pressure (a critical pressure, a supercritical pressure, and a subcritical pressure) is maximized to a temperature higher than the specific heat maximum temperature at constant pressure Tmax, like the high-pressure evaporator 26 in the first embodiment. Furthermore, the high-pressure pump 23 is also a pump configured to increase a pressure of the water which has been heated by the low-pressure economizer 21 to the critical pressure, the supercritical pressure, or the subcritical pressure, like the high-pressure pump 23 in the first embodiment.

Next, an operation of the above-described combined cycle plant will be described.

Like in the first embodiment, an exhaust gas EG from the gas turbine 10 is discharged from the chimney 39 via the waste heat recovery boiler 20a.

In the waste heat recovery boiler 20a, water from the steam condenser 51 is supplied to the low-pressure economizer 21 located furthest downstream via the water supply line 77. The low-pressure economizer 21 heats the water by exchanging heat with the exhaust gas EG. A portion of the water which has been heated by the low-pressure economizer 21 is further heated by the low-pressure evaporator 22 and is converted into steam. The steam is sent to the low-pressure reheater 31 via the first low-pressure water line 78 and the intermediate-pressure steam recovery line 74. Furthermore, a pressure of the remaining water which has been heated by the low-pressure economizer 21 is increased to a critical pressure, a supercritical pressure, or a subcritical pressure by the high-pressure pump 23, and the remaining water is sent to the high-pressure economizer 25 as high-pressure water HW. The high-pressure economizer 25 heats the high-pressure water HW by exchanging heat with the exhaust gas EG. The high-pressure water HW which has been heated by the high-pressure economizer 25 is further heated by the high-pressure evaporator 26 and is converted into steam. The steam is further superheated by the first high-pressure superheater 27 and the second high-pressure superheater 28 and is converted into high-pressure steam HS. The high-pressure steam HS is supplied to the high-pressure steam turbine 41 via the high-pressure steam supply line 71.

The high-pressure steam HS supplied to the high-pressure steam turbine 41 rotates the turbine rotor of the high-pressure steam turbine 41. The generator 61 connected to the high-pressure steam turbine 41 generates electricity using rotation of the turbine rotor. The high-pressure steam HS which has passed through the high-pressure steam turbine 41 is sent to the intermediate reheater 32 (a second reheater) via the high-pressure steam recovery line 72a as reheating intermediate-pressure steam FRHS2 (second reheating steam).

A temperature of reheating intermediate-pressure steam FRHS2 is higher than the specific heat maximum temperature at constant pressure Tmax (a high-pressure maximum temperature Tmax-HP) in the high-pressure evaporator 26. In other words, when water with a critical pressure is supplied to the high-pressure evaporator 26, a temperature of the reheating intermediate-pressure steam FRHS2 is higher than the critical temperature Tmax1, and when water with a supercritical pressure is supplied to the high-pressure evaporator 26, the temperature of the reheating intermediate-pressure steam FRHS2 is higher than the pseudo critical temperature Tmax2 at a pressure of the water supplied to the high-pressure evaporator 26. Furthermore, when water with a subcritical pressure is supplied to the high-pressure evaporator 26, a temperature of the reheating intermediate-pressure steam FRHS2 is higher than the saturation temperature Tmax3 at the pressure of the water supplied to the high-pressure evaporator 26. The intermediate reheater 32 heats the reheating intermediate-pressure steam FRHS2. The reheating intermediate-pressure steam FRHS2 which has been heated by the intermediate reheater 32 is supplied to the intermediate-pressure steam turbine 42 (the second steam turbine and the second reheated steam turbine) via the reheated intermediate-pressure steam supply line 73 as reheated intermediate-pressure steam RHS2.

The reheated intermediate-pressure steam RHS2 supplied to the intermediate-pressure steam turbine 42 rotates the turbine rotor in the intermediate-pressure steam turbine 42. The generator 62 connected to the intermediate-pressure steam turbine 42 generates electricity using rotation of the turbine rotor. The reheated intermediate-pressure steam RHS2 which has passed through the intermediate-pressure steam turbine 42 is sent to the low-pressure reheater 31 via the intermediate-pressure steam recovery line 74. The steam which has been generated by the low-pressure evaporator 22 is also sent to the low-pressure reheater 31 via the low-pressure steam line 75 and the intermediate-pressure steam recovery line 74 as described above. In other words, the reheated intermediate-pressure steam which has passed through the intermediate-pressure steam turbine 42 joins the steam which has been generated by the low-pressure evaporator 22 and the joined steam flows into the low-pressure reheater 31 (a first reheater) as reheating low-pressure steam FRHS1 (first reheating steam).

A temperature of the reheating low-pressure steam FRHS1 is lower than the specific heat maximum temperature at constant pressure Tmax (the high-pressure maximum temperature Tmax-HP) in the high-pressure evaporator 26. In other words, when water with a critical pressure is supplied, to the high-pressure evaporator 26, a temperature of the reheating low-pressure steam FRHS1 is lower than the critical temperature Tmax1, and when water with a supercritical pressure is supplied to the high-pressure evaporator (EVA-HP) 26, a temperature of the reheating low-pressure steam FRHS1 is lower than the pseudo critical temperature Tmax2 at a pressure of the water supplied to the high-pressure evaporator 26. Furthermore, when water with a subcritical pressure is supplied to the high-pressure evaporator 26, a temperature of the reheating intermediate-pressure steam FRHS2 is lower than the saturation temperature Tmax3 at the pressure of the water supplied to the high-pressure evaporator 26. The low-pressure reheater 31 heats the reheating low-pressure steam FRHS1 to a temperature less than the specific heat maximum temperature at constant pressure Tmax (the high-pressure maximum temperature Tmax-HP). Thus, with regard to a temperature of an exhaust gas EG passing through the low-pressure reheater 31 and a temperature and a flow rate of the reheating low-pressure steam FRHS1 flowing into the low-pressure reheater 31, the low-pressure reheater 31 is set to have a heat transfer area such that a temperature of the reheating low-pressure steam FRHS1 flowing out of the low-pressure reheater 31 is increased to less than the specific heat maximum temperature at constant pressure Tmax (the high-pressure maximum temperature Tmax-HP). The reheating low-pressure steam FRHS1 which has been heated by the low-pressure reheater 31 is supplied to the low-pressure steam turbine (the second steam turbine, a first reheated steam turbine) 43 via the reheated low-pressure steam supply line 76 as reheated low-pressure steam RHS1.

The reheated low-pressure steam RHS1 supplied to the low-pressure steam turbine 43 rotates the turbine rotor in the low-pressure steam turbine 43. The generator 63 connected to the low-pressure steam turbine 43 generates electricity using rotation of the turbine rotor. The reheated low-pressure steam which has passed through the low-pressure steam turbine 43 flows into the steam condenser 51 and is converted into water by the steam condenser 51. The water in the steam condenser 51 is supplied to the low-pressure economizer 21 using the water supply pump 53 as described above.

Next, a relationship between a quality of heat and a temperature along with flows of an exhaust gas EG and water (containing steam) in the steam turbine plant STP2 in this embodiment will be described using the TQ diagram in FIG. 5. The TQ diagram is a TQ diagram of an interval D from the second high-pressure superheater (SH2-HP) 28 located furthest upstream in the direction in which the exhaust gas EG flows to the low-pressure reheater (RH-LP) 31 and the high-pressure economizer (ECO-HP) 25 in the waste heat recovery boiler 20a as shown in FIG. 4. Note that the TQ diagram does not quantitatively represent a relationship between a quantity of heat and a temperature along with flows of an exhaust gas EG and water (containing steam), but qualitatively represents the relationship therebetween, like in the TQ diagrams in FIGS. 2 and 3. Furthermore, FIG. 5 illustrates a case in which water heated by the high-pressure evaporator 26 has a supercritical pressure as an example.

Also in the steam turbine plant STP2 in this embodiment, a temperature of an exhaust gas EG (indicated by a dotted line) gradually decreases as it flows downstream, and a quantity of heat thereof is decreased. On the other hand, a temperature of water (containing steam) HW/HS supplied to the high-pressure steam turbine 41 gradually increases as it flows upstream due to heat exchanged with the exhaust gas EG, and a quantity of heat thereof is increased. To be specific, a temperature of water which has flowed into the high-pressure economizer (ECO-HP) 25 at the downstream side gradually increases as it flows toward the high-pressure economizer (ECO-HP) 25, the high-pressure evaporator (EVA-HP) 26, the first high-pressure superheater (SH-HP) 27, the second high-pressure superheater (SH2-HP) 28, and the upstream side, and a quantity of heat thereof is increased. The water (containing steam) HW/HS supplied to the high-pressure steam turbine 41 is heated to a temperature higher than the specific heat maximum temperature at constant pressure Tmax (the high-pressure maximum temperature Tmax-HP) according to the water in a process in which it passes through the high-pressure evaporator (EVA-HP) 26.

Reheating low-pressure steam FRHS1 with a temperature lower than the specific heat maximum temperature at constant pressure Tmax (the high-pressure maximum temperature Tmax-HP) in the high-pressure evaporator (EVA-HP)

26 flows into the low-pressure reheater (RH-LP) 31 as described above. Furthermore, an exhaust gas EG with the same temperature as an exhaust gas EG passing through the high-pressure economizer (ECO-HP) 25 disposed at substantially the same position as the low-pressure reheater (RH-LP) 31 in the direction in which the exhaust gas EG flows passes through the low-pressure reheater (RH-LP) 31. A temperature of the reheating low-pressure steam FRHS1 gradually increases in a process in which it passes through the low-pressure reheater (RH-LP) 31 due to heat exchange with the exhaust gas EG, and a quantity of heat thereof is increased. Here, the reheating low-pressure steam FRHS1 is heated only to a temperature less than the specific heat maximum temperature at constant pressure Tmax (the high-pressure maximum temperature Tmax-HP) in the high-pressure evaporator (EVA-HP) 26 as described above. The reheating low-pressure steam FRHS1 is supplied to the low-pressure steam turbine 43 as reheated low-pressure steam RHS1 when heated by the low-pressure reheater (RH-LP) 31.

Also in the steam turbine plant STP2 in this embodiment, all reheaters low-pressure reheater (RH-LP) 31 in this embodiment) configured to supply the reheated low-pressure steam RHS1 to the low-pressure steam turbine 43 (the second steam turbine) are disposed only at the downstream side of the high-pressure evaporator (EVA-HP) 26 in the direction in which the exhaust gas EG (the heated fluid) flows. Moreover, in the low-pressure reheater (RH-LP) 31 configured to supply the reheated low-pressure steam RHS1 to the low-pressure steam turbine 43, reheating steam FRHS is heated such that the specific heat maximum temperature at constant pressure Tmax (the high-pressure maximum temperature Tmax-HP) in the high-pressure evaporator (EVA-HP) 26 is not crossed in a process in which the reheating low-pressure steam FRHS1 which is the reheated low-pressure steam RHS1 is heated.

Thus, since a quantity of heat of a temperature near the specific heat maximum temperature at constant pressure Tmax (the high-pressure maximum temperature Tmax-HP) in the high-pressure evaporator (EVA-HP) 26 which is a quantity of heat consumed by the low-pressure reheater (RH-LP) 31 can be minimized in this embodiment as well, a large amount of heat of the same temperature level is used by the high-pressure evaporator (EVA-HP) 26 and thus a flow rate of steam generated by the high-pressure evaporator (EVA-HP) 26 can be increased. Moreover, a difference $\Delta T1$ between a temperature of the reheating low-pressure steam FRHS1 flowing into the low-pressure reheater (RH-LP) 31 and a temperature of the exhaust gas EG heating the reheating low-pressure steam FRHS1 is small, efficiency of heat exchange between the exhaust gas EG and the reheating low-pressure steam FRHS1 is good, and thus heat of the exhaust gas EG in the low-pressure reheater (RH-LP) 31 can also be effectively used in view of this.

As described above, the reheating intermediate-pressure steam FRHS2 of a temperature higher than the specific heat maximum temperature at constant pressure Tmax (the high-pressure maximum temperature Tmax-HP) in the high-pressure evaporator (EVA-HP) 26 flows into the intermediate reheater (RH-IP) 32. A temperature of the reheating intermediate-pressure steam FRHS2 gradually increases in a process in which it passes through the intermediate reheater (RH-IP) 32 due to heat exchange with the exhaust gas EG, and a quantity of heat thereof is increased. The reheating intermediate-pressure steam FRHS2 is supplied to the intermediate-pressure steam turbine 42 as reheated intermediate-pressure steam RHS2 when heated by the intermediate reheater (RH-IP) 32.

In the steam turbine plant STP2 in this embodiment, all heaters (one intermediate reheater (RH-IP) 32 in this embodiment) configured to supply the reheated intermediate-pressure steam RHS2 to the intermediate-pressure steam turbine 42 (the second steam turbine) are disposed only at the upstream side of the high-pressure evaporator (EVA-HP) 26 in the direction in which the exhaust gas EG (the heated fluid) flows. Moreover, the intermediate reheater (RH-IP) 32 configured to supply the reheated intermediate-pressure steam RHS2 to the intermediate-pressure steam turbine 42 heats the reheating intermediate-pressure steam FRHS2 with a temperature higher than the specific heat maximum temperature at constant pressure Tmax (the high-pressure maximum temperature Tmax-HP) in the high-pressure evaporator (EVA-HP) 26. In other words, the specific heat maximum temperature at constant pressure Tmax (the high-pressure maximum temperature Tmax-HP) in the high-pressure evaporator (EVA-HP) 26 is not crossed in a process in which the reheating intermediate-pressure steam FRHS2 is heated by the intermediate reheater (RH-IP) 32 configured to supply the reheated intermediate-pressure steam RHS2 to the intermediate-pressure steam turbine 42.

Thus, since a quantity of heat of a temperature near the specific heat maximum temperature at constant pressure Tmax (the high-pressure maximum temperature Tmax-HP) in the high-pressure evaporator (EVA-HP) 26 which is a quantity of heat consumed by the intermediate reheater (RH-IP) 32 can be minimized in this embodiment, a large amount of heat of the same temperature level is used by the high-pressure evaporator (EVA-HP) 26 and thus a flow rate of steam generated by the high-pressure evaporator (EVA-HP) 26 can be increased. Moreover, a difference $\Delta T2$ between a temperature of the reheating intermediate-pressure steam FRHS2 flowing into the intermediate reheater (RH-IP) 32 and a temperature of the exhaust gas EG heating the reheating intermediate-pressure steam FRHS2 is small, efficiency of heat exchange between the exhaust gas EG and the reheating intermediate-pressure steam FRHS2 is good, and thus heat of the exhaust gas EG in the intermediate reheater (RH-IP) 32 can also be effectively used in view of this.

Thus, in this embodiment, much high temperature steam can efficiently supplied to the high-pressure steam turbine 41 and an output obtained from the entire steam turbine group can be increased even when steam heated by the low-pressure reheater 31 is supplied to the low-pressure steam turbine 43 and steam heated by the intermediate reheater 32 is being supplied to the intermediate-pressure steam turbine 42, For this reason, efficiency of a steam turbine plant can be increased in this embodiment.

"First Modified Example of Steam Turbine Plant"

Figure 6:
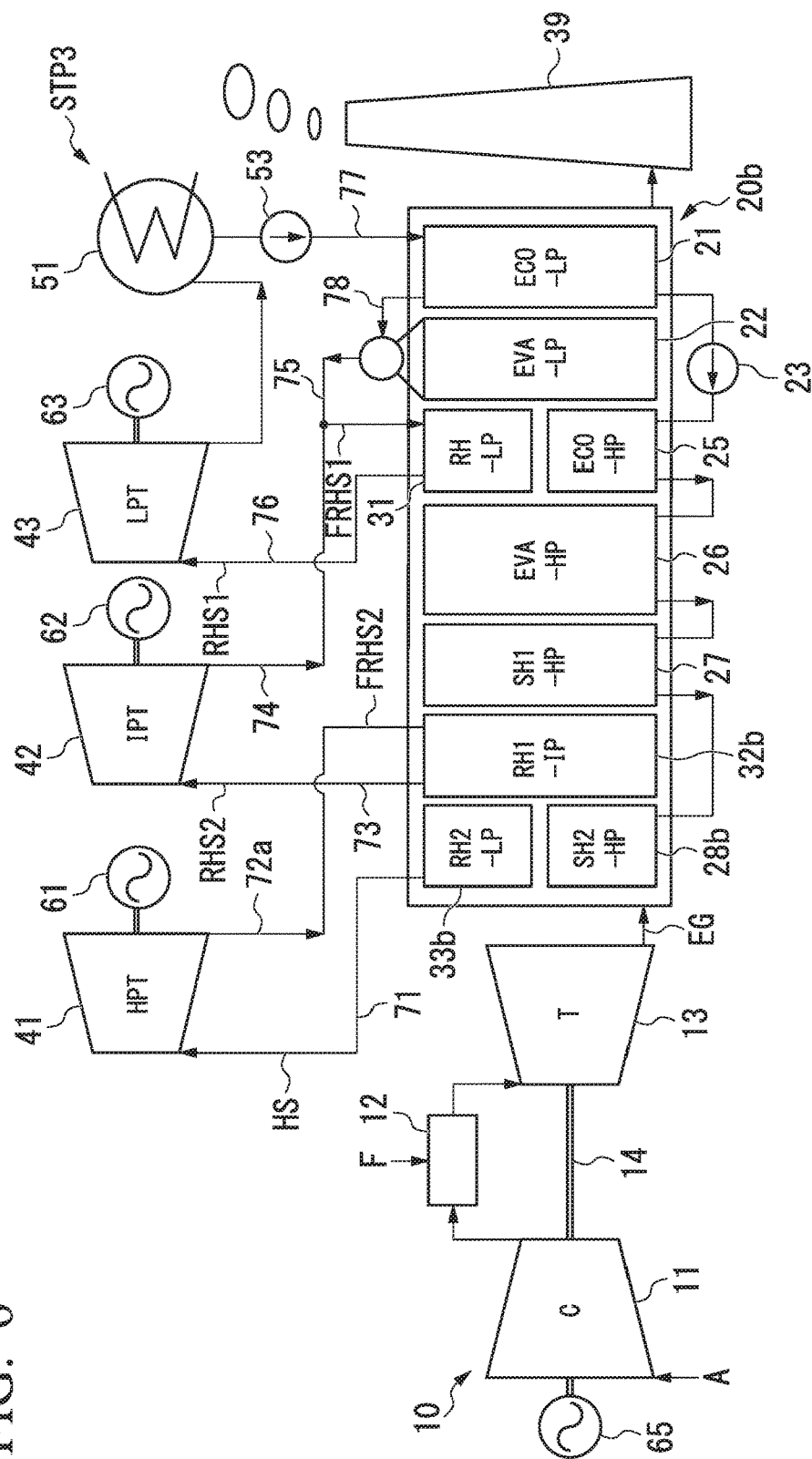
FIG. 6 is a system diagram of a steam turbine plant a first modified example according to the present invention.

Next, a first modified example of a steam turbine plant will be described with reference to FIG. 6.

A steam turbine plant STP3 in this modified example is a modified example of the steam turbine plant STP2 in the second embodiment, is constituted of a first intermediate reheater (RH1-IP) 32*b* and a second intermediate reheater (RH2-IP) 33*b* disposed further upstream than the first intermediate reheater 32*b* instead of the intermediate reheater (RH-IP) 32 in the second embodiment, and is basically the same as the second embodiment with regard to other constitutions.

The first intermediate reheater 32*b* is disposed between a first high-pressure superheater 27 and a second high-pressure superheater 28b in a direction in which an exhaust gas EG in a waste heat recovery boiler 20b flows, like the intermediate reheater 32 in the second embodiment. The second intermediate reheater 33b is disposed at substantially the same position as the second high-pressure superheater 28b disposed at the upstream side of the first intermediate reheater 32b in the direction in which the exhaust gas EG flows. A steam inlet of the first intermediate reheater 32b is connected to a steam outlet in a high-pressure steam turbine 41 using a high-pressure steam recovery line 72a, like the intermediate reheater 32 in the second embodiment. Furthermore, a steam outlet in the second intermediate reheater 33b is connected to a steam inlet of an intermediate-pressure steam turbine 42 using a reheated intermediate-pressure steam supply line 73, like the intermediate reheater 32 in the second embodiment.

In this modified example, two intermediate reheaters such as the first intermediate reheater 32b and the second intermediate reheater 33b are provided instead of the intermediate reheater 32 as described above in the second embodiment. However, both of the first intermediate reheater 32b and the second intermediate reheater 33b are reheaters configured to supply reheated intermediate-pressure steam RHS2 to the intermediate-pressure steam turbine 42 (a second steam turbine) and are disposed only at the upstream side of a high-pressure evaporator 26 in the direction in which the exhaust gas EG (a heated fluid) flows. Moreover, all the reheaters 32b and 33b configured to supply the reheated intermediate-pressure steam RHS2 to the intermediate-pressure steam turbine 42 heat reheating intermediate-pressure steam FMK with a temperature higher than a specific heat maximum temperature at constant pressure Tmax (a high-pressure maximum temperature Tmax-HP) in the high-pressure evaporator 26 using the exhaust gas EG with a high temperature.

Thus, also in the steam turbine plant STP3 in this modified example, the same effects as the steam turbine plant STP2 in the second embodiment can be obtained.

As described above, even when a plurality of reheaters configured to supply reheated steam to any of steam turbines are provided, the same effects as the above-described embodiments can be obtained as long as all of the reheaters are provided only at the upstream side or only at the downstream side of the high-pressure evaporator 26 and reheating steam is heated such that the specific heat maximum temperature at constant pressure Tmax (the high-pressure maximum temperature Tmax-HP) in the high-pressure evaporator 26 is not crossed. In other words, since a quantity of heat of a temperature level near the specific heat maximum temperature at constant pressure Tmax (the high-pressure maximum temperature Tmax-HP) in the high-pressure evaporator 26 which is a quantity of heat consumed by all the reheaters can be minimized in this modified example, a large amount of heat of the same temperature level is used by the high-pressure evaporator 26 and thus a flow rate of steam generated by the high-pressure evaporator 26 can be increased. Therefore, much high temperature steam can be efficiently supplied to the high-pressure steam turbine 41 and thus an output obtained from the entire steam turbine group can be increased. For this reason, efficiency of a steam turbine plant can be increased in this modified example.

Note that, here, a plurality of reheaters configured to supply reheated steam to any of steam turbines are connected in series, but they may be connected in parallel.

"Second Modified Example of Steam Turbine Plant"

Figure 7:
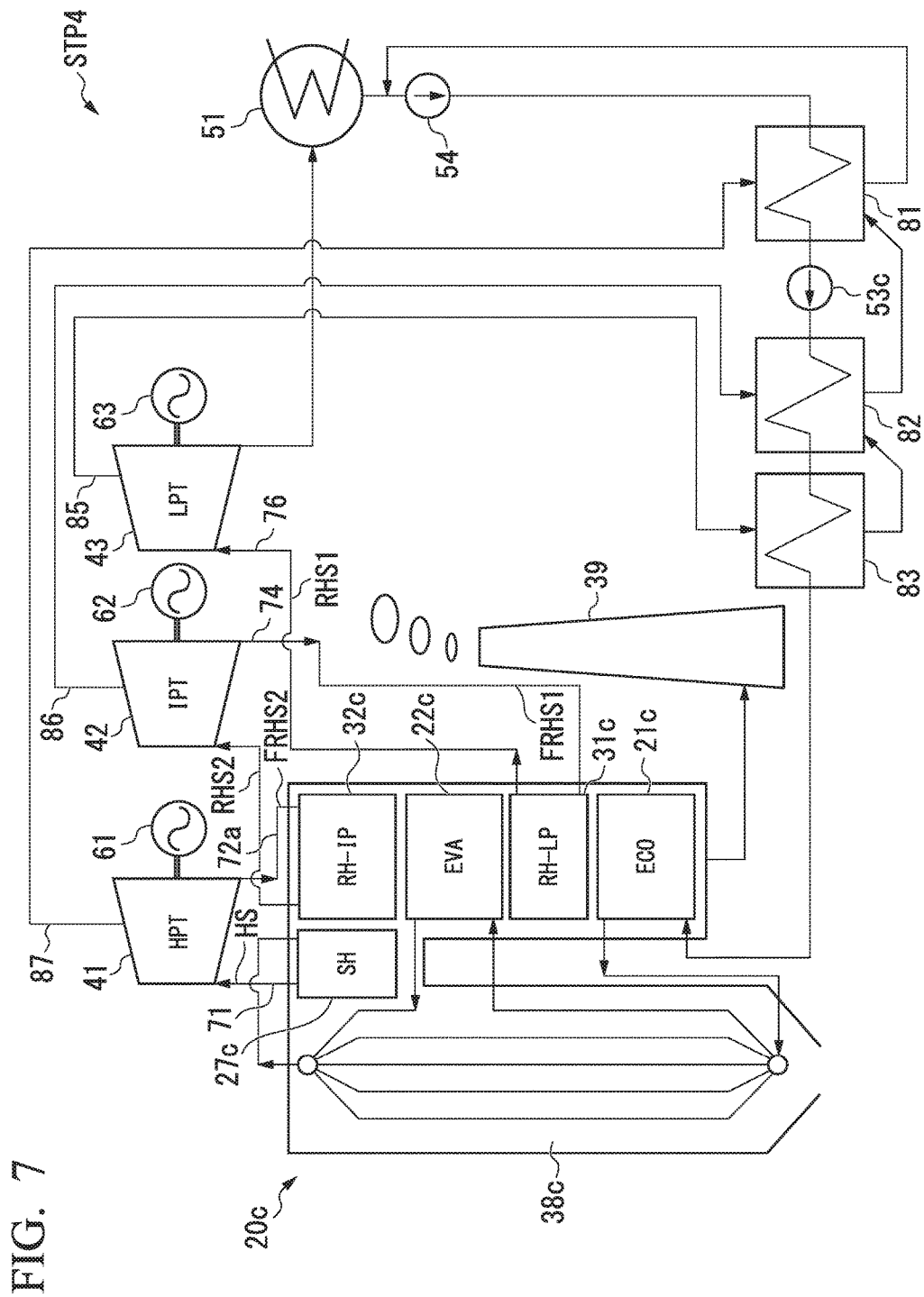
FIG. 7 is a system diagram of a steam turbine plant in a second modified example according to the present invention.

Next, a second modified example of a steam turbine plant will be described with reference to FIG. 7.

A steam turbine plant STP4 in this modified example also includes a boiler 20c and steam turbines 41, 42, and 43 driven using the steam which has been generated by the boiler 20c, like the steam turbine plants in the above-described embodiments and the first modified example.

The steam turbine plant STP4 in this modified example includes the high-pressure steam turbine 41, the intermediate-pressure steam turbine 42, and the low-pressure steam turbine 43 as steam turbines. Rotors in generators 61, 62, and 63 are connected to a turbine rotor in the high-pressure steam turbine 41, a turbine rotor in the intermediate-pressure steam turbine 42, and a turbine rotor in the low-pressure steam turbine 43, respectively.

Boilers in steam turbine plants in the above-described embodiments and the first modified example are waste heat recovery boilers 20, 20a, and 20b which do not include furnaces and use heat of an exhaust gas EG from a gas turbine 10 to generate steam. On the other hand, a boiler in the steam turbine plant STP4 in this modified example is the boiler 20c including a furnace 38c. A combustion gas which has been generated by the furnace 38c flows in the boiler 20c. The boiler 20c heats water or the like using the combustion gas to generate steam. The combustion gas which has been exhausted from the boiler 20c is discharged to the atmosphere via a chimney 39.

The boiler 20c in this modified example includes the furnace 38c configured to burn a fuel such as oil and a gas, an economizer 21c configured to heat water, an evaporator 22c configured to convert the water heated by the economizer 21c, a superheater 27c configured to superheat heat which has been generated by the evaporator 22c to generate high-pressure steam HS, an intermediate reheater 32c configured to heat steam which has been exhausted from the high-pressure steam turbine 41 as reheating intermediate-pressure steam FRHS2, and a low-pressure reheater 31c configured to heat reheating low-pressure steam FRHS1 containing steam which has been exhausted from the intermediate-pressure steam turbine 42.

Here, a side at which the chimney 39 is present is set as a downstream side and a side opposite thereto is set as an upstream side of the furnace 38c in a direction in which a combustion gas flows in the boiler 20c, The economizer 21c, the low-pressure reheater 31c, the evaporator 22c, the intermediate reheater 32c, the superheater 27c, and the furnace 38c are disposed in this order from the downstream side toward the upstream side of the boiler 20c.

The steam turbine plant STP4 in this modified example further includes a steam condenser 51 configured to convert steam which has been exhausted from the low-pressure steam turbine 43 into water, a condensate pump 54 configured to increase a pressure of the water from the steam condenser 51, a water supply pump 53c configured to further increase a pressure of the water with the pressure increased by the condensate pump 54 and feed the water to the boiler 20c, and feed water heaters 81, 82, and 83 configured to heat the water from the steam condenser 51.

The feed water heaters 81, 82, and 83 correspond to a primary feed water heater 81 configured to primarily heat water from the steam condenser 51, a secondary feed water heater 82 configured to further heat the water which has been heated by the primary feed water heater 81, and a tertiary feed water heater 83 configured to further heat the water which has been heated by the secondary feed water heater 82. The water supply pump 53c is disposed between the primary feed water heater 81 and the secondary feed water heater 82, increases a pressure of water which has been heated by the primary feed water heater 81, and sends the water to the boiler 20c via the secondary feed water heater 82 and the tertiary feed water heater 83.

A steam outlet in the superheater 27c and a steam inlet in the high-pressure steam turbine 41 are connected using a high-pressure steam supply line 71 through which high-pressure steam HS which is the steam which has been superheated by the superheater 27c is supplied to the high-pressure steam turbine 41. A steam outlet in the high-pressure steam turbine 41 and a steam inlet in the intermediate reheater 32c are connected using a high-pressure steam recovery line 72a. A steam outlet in the intermediate reheater 32c and a steam inlet in the intermediate-pressure steam turbine 42 are connected using a reheated intermediate-pressure steam supply line 73 through which reheated intermediate-pressure steam RHS2 which is the steam which has been heated by the intermediate reheater 32c is supplied to the intermediate-pressure steam turbine 42. A steam outlet in the intermediate-pressure steam turbine 42 and a steam inlet in the low-pressure reheater 31c are connected using an intermediate-pressure steam recovery line 74. A steam outlet in the low-pressure reheater 31c and a steam inlet in the low-pressure steam turbine 43 are connected using a reheated low-pressure steam supply line 76 through which reheated low-pressure steam RHS1 which is the steam which has been heated by the low-pressure reheater 31c is supplied to the low-pressure steam turbine 43. A steam outlet in the low-pressure steam turbine 43 and the steam condenser 51 are connected to each other such that the steam which has been exhausted from the low-pressure steam turbine 43 is supplied to the steam condenser 51. A steam bleed port in the low-pressure steam turbine 43 and the primary feed water heater 81 are connected using a low-pressure bleed line 85 through which the steam which has been bled through the steam bleed port is sent to the primary feed water heater 81 as a heat source in the primary feed water heater 81. A steam bleed port in the intermediate-pressure steam turbine 42 and the secondary feed water heater 82 are connected using an intermediate-pressure bleed line 86 through which the steam which has been bled through the steam bleed port is sent to the secondary feed water heater 82 as a heat source in the secondary feed water heater 82. A steam bleed port in the high-pressure steam turbine 41 and the tertiary feed water heater 83 are connected using a high-pressure bleed line 87 through which the steam which has been bled through the steam bleed port is sent to the tertiary feed water heater 83 as a heat source in the tertiary feed water heater 83.

The evaporator 22c in this modified example is an apparatus configured to heat water with a temperature lower than a specific heat maximum temperature at constant pressure Tmax (a high-pressure maximum temperature Tmax-HP) to a temperature higher than the specific heat maximum temperature at constant pressure Tmax, like the high-pressure evaporator 26 in the above-described embodiments and the first modified example. Furthermore, the water supply pump 53c in this modified example is a pump configured to increase a pressure of water to a critical pressure, a supercritical pressure, or a subcritical pressure, like the high-pressure pump 23 in the above-described embodiments and the first modified example.

Next, an operation of the steam turbine plant STP4 in this modified example will be described.

The water which has been heated by the plurality of feed water heaters 81, 82, and 83 is supplied to the economizer 21c located furthest downstream in the boiler 20c. The economizer 21c heats the water by exchanging heat with a combustion gas. The water which has been heated by the economizer 21c is sent to the evaporator 22c via a water pipe or the like provided in the furnace 38c. The evaporator 22c further heats the water to convert the water into steam. The steam is sent to the superheater 27c via a water pipe or the like provided in the furnace 38c. The superheater 27c superheats the steam to convert the steam into high-pressure steam HS. The high-pressure steam HS is supplied to the high-pressure steam turbine 41 via the high-pressure steam supply line 71.

The high-pressure steam HS which has passed through the high-pressure steam turbine 41 is sent to the intermediate reheater 32c via the high-pressure steam recovery line 72a as reheating intermediate-pressure steam FRHS2. A temperature of the reheating intermediate-pressure steam FRHS2 is higher than the specific heat maximum temperature at constant pressure Tmax (the high-pressure maximum temperature Tmax-HP) in the evaporator 22c. The intermediate reheater 32c heats the reheating intermediate-pressure steam FRHS2. The reheating intermediate-pressure steam FRHS2 which has been heated by the intermediate reheater 32c is supplied to the intermediate-pressure steam turbine 42 via the reheated intermediate-pressure steam supply line 73 as reheated intermediate-pressure steam RHS2.

The reheated intermediate-pressure steam RHS2 which has passed through the intermediate-pressure steam turbine 42 is sent to the low-pressure reheater 31c via the intermediate-pressure steam recovery line 74 as reheating low-pressure steam FRHS1. A temperature of the reheating low-pressure steam FRHS1 is lower than the specific heat maximum temperature at constant pressure Tmax (the high-pressure maximum temperature Tmax-HP) in the evaporator 22c. The low-pressure reheater 31c heats the reheating low-pressure steam FRHS1 to a temperature less than e specific heat maximum temperature at constant pressure Tmax (the high-pressure maximum temperature Tmax-HP). The reheating low-pressure steam FRHS1 which has been heated by the low-pressure reheater 31c is supplied to the low-pressure steam turbine 43 via the reheated low-pressure steam supply line 76 as reheated low-pressure steam RHS1.

The reheated low-pressure steam RHS1 which has passed through the low-pressure steam turbine 43 flows into the steam condenser 51 and is converted into water by the steam condenser 51. The water inside the steam condenser 51 is sent to the primary feed water heater 81 using the condensate pump 54. In the primary feed water heater 81, the water is heated by exchanging heat with the steam which has been bled from the low-pressure steam turbine 43. A pressure of the water which has been heated by the primary feed water heater 81 is increased by the water supply pump 53c and then the water is sent to the secondary feed water heater 82. In the secondary feed water heater 82, the water is heated by exchanging heat with the steam which has been bled from the intermediate-pressure steam turbine 42. The water which has been heated by the secondary feed water heater 82 is sent to the tertiary feed water heater 83. In the tertiary feed water heater 83, the water is heated by exchanging heat with the steam which has been bled from the high-pressure steam turbine 41. The water which has been heated by the tertiary feed water heater 83 is sent to the economizer 21c in the boiler 20c.

Also in the steam turbine plant STP4 in this modified example, all reheaters (one low-pressure reheater 31c in this modified example) configured to supply reheated low-pressure steam RHS1 to the low-pressure steam turbine 43 (the second steam turbine) are disposed only at the downstream side of the evaporator 22c in a direction in which a combustion gas (a heated fluid) flows. Moreover, in the low-pressure reheater 31c configured to supply reheated low-pressure steam RHS1 to the low-pressure steam turbine 43, reheating steam FRHS is heated such that the specific heat maximum temperature at constant pressure Tmax (the high-pressure maximum temperature Tmax-HP) in the evaporator 22c is not crossed in a process in which reheating low-pressure steam FRHS1 is heated.

Also, in the steam turbine plant STP4 in this modified example, all reheaters (one intermediate reheater 32c in this modified example) configured to supply reheated intermediate-pressure steam RHS2 to the intermediate-pressure steam turbine 42 (the second steam turbine) are disposed only at the upstream side of the evaporator 22c in a direction in which a combustion gas flows. Moreover, in the intermediate reheater 32c configured to supply reheated intermediate-pressure steam RHS2 to the intermediate-pressure steam turbine 42, reheating intermediate-pressure steam FRHS2 with a temperature higher than the specific heat maximum temperature at constant pressure Tmax in the evaporator 22c is heated.

Thus, also in this modified example, much high temperature steam can be efficiently supplied to the high-pressure steam turbine 41 and an output obtained from the entire steam turbine group can be increased even when the steam which has been heated by the low-pressure reheater 31c is supplied to the low-pressure steam turbine 43 and the steam which has been heated by the intermediate reheater 32c is being supplied to the intermediate-pressure steam turbine 42. For this reason, also in this modified example, efficiency of a steam turbine plant can be increased.

As described above, a boiler generating steam may not be a waste heat recovery boiler configured to generate steam using heat of an exhaust gas EG from the gas turbine 10 and may be, for example, the boiler 20c including the furnace 38c, like in this modified example. Furthermore, the waste heat recovery boiler may use, for example, an exhaust gas EG from a cement plan a blast furnace, or the like instead of using an exhaust gas EG from the gas turbine 10.

Note that, in the above-described embodiments and modified examples, water which has a critical pressure or a supercritical pressure and has a temperature lower than a critical temperature (in the case of the critical pressure) or a pseudo critical temperature (in the case of the supercritical pressure) flows into an evaporator into which water with the highest pressure flows, and the evaporator preferably heats the water to a temperature higher than a critical temperature (in the case of the critical pressure) or a pseudo critical temperature (in the case of the supercritical pressure). This is because a temperature and a pressure of steam supplied from the evaporator to the high-pressure steam turbine are increased and thus an energy drop of the steam in a process in which the steam passes through a group of steam turbines is increased. In addition, this is because a temperature and a pressure of reheated steam flowing out of a reheater are increased.

"Modified Example of Steam Turbine"

Next, a modified example of a steam turbine will be described with reference to FIG. 8.

All of the plurality of steam turbines included in the steam turbine plant in the above-described embodiments and modified example include a turbine rotor for each steam turbine. However, one of the steam turbines and the other thereof may use a turbine rotor together. In other words, the plurality of steam turbines may be a compound type steam turbine in which they use a turbine rotor together.

Figure 8:
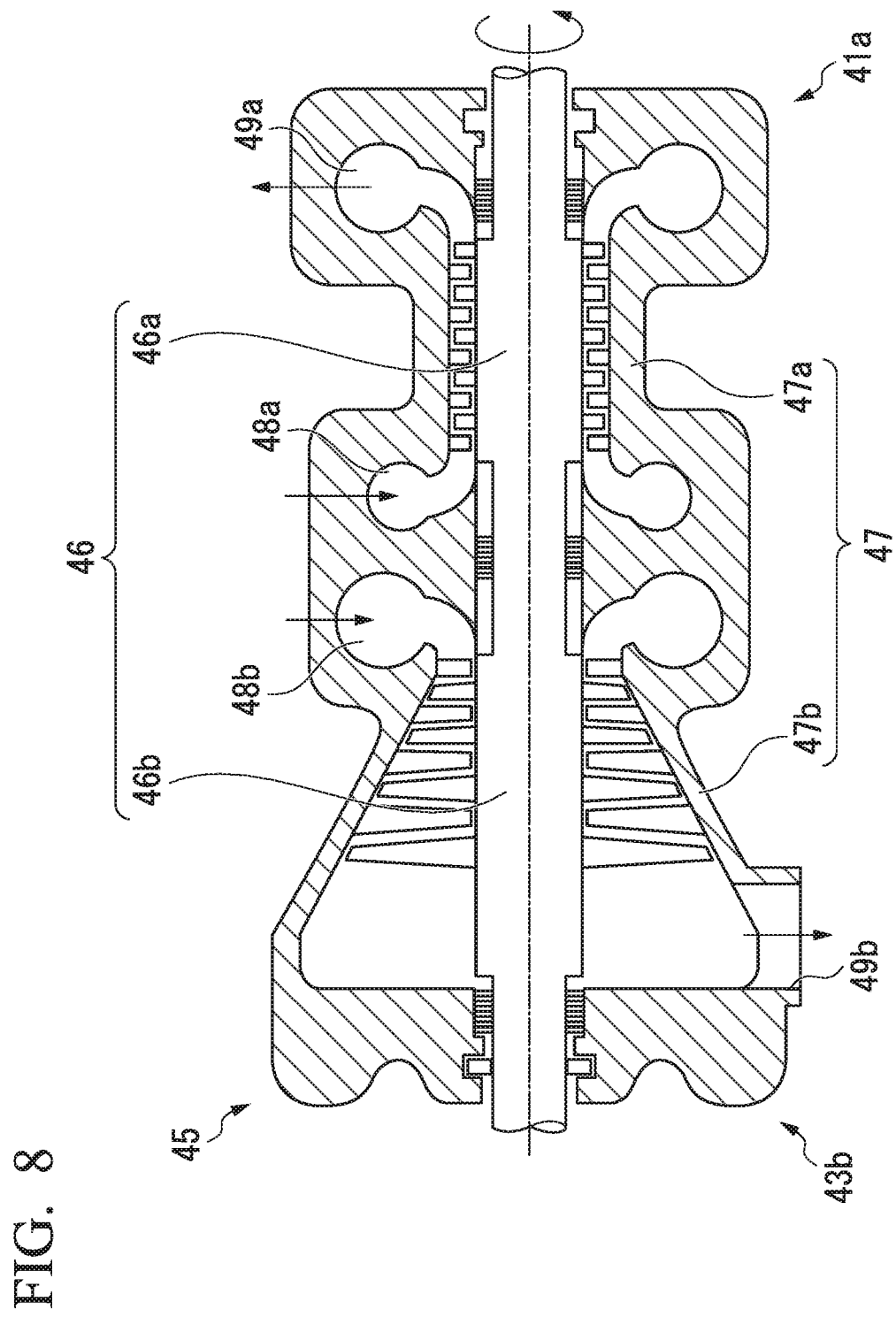
FIG. 8 is a cross-sectional view of a steam turbine in a modified example according to the present invention.

A steam turbine in this modified example is a compound type steam turbine 45 in which two steam turbines 41a and 43b use a turbine rotor 46 together as shown in FIG. 8. One steam turbine of the two steam turbines 41a and 43b constituting the compound type steam turbine 45 corresponds to, for example, a high-pressure steam turbine 41a and the other steam turbine corresponds to, for example, a low-pressure steam turbine 43b.

The compound type steam turbine 45 includes the turbine rotor 46 and turbine casing 47. One side of the turbine rotor 46 in an axial direction thereof is a high-pressure rotor unit 46a and the other side thereof is a low-pressure rotor unit 46b. The turbine casing 47 includes a high-pressure casing unit 47a configured to cover the high-pressure rotor unit 46a in the turbine rotor 46 and a low-pressure casing unit 47b configured to cover the low-pressure rotor unit 46b in the turbine rotor 46. The high-pressure steam turbine 41a includes the high-pressure rotor unit 46a and the high-pressure casing unit 47a. The low-pressure steam turbine 43b includes the low-pressure rotor unit 46b and the low-pressure casing unit 47b. One generator is connected to the turbine rotor 46 in the compound type steam turbine 45. In other words, when a plurality of steam turbines have been constituted as a compound, a generator need not be connected for each plurality of steam turbines, like in the above-described embodiments and modified examples.

A high-pressure steam inlet 48a configured to guide steam into the high-pressure casing unit 47a and a high-pressure steam outlet 49a configured to exhaust the steam inside the high-pressure casing unit 47a to the outside of the turbine casing 47 are formed in the high-pressure casing unit 47a. Furthermore, a low-pressure steam inlet 48b configured to guide steam into the low-pressure casing unit 47b and a low-pressure steam outlet 49b configured to exhaust the steam inside the low-pressure casing unit 47b to the outside of the turbine casing 47 are formed in the low-pressure casing unit 47b.

The high-pressure steam inlet 48a in the high-pressure steam turbine 41a is connected to, for example, a steam outlet in the high-pressure superheater 27, like the steam inlet in the high-pressure steam turbine 41 in the first embodiment. The high-pressure steam outlet 49a in the high-pressure steam turbine 41a is connected to, for example, a steam inlet in the reheater 31, like the steam outlet in the high-pressure steam turbine 41 in the first embodiment. The low-pressure steam inlet 48b in the low-pressure steam turbine 43b is connected to, for example, a steam outlet in the reheater 31, like the steam inlet in the low-pressure steam turbine 43 in the first embodiment. The low-pressure steam outlet 49b in the low-pressure steam turbine 43 is connected to, for example, the steam condenser 51, like the steam outlet in the low-pressure steam turbine 43 in the first embodiment.

Note that, although an example in which the high-pressure steam turbine and the low-pressure steam turbine are constituted as a compound has been described above, the high-pressure steam turbine, the intermediate-pressure steam turbine, and the low-pressure steam turbine may be constituted as a compound. Examples of a compound type with respect to the high-pressure steam turbine, intermediate-pressure steam turbine, and low-pressure steam turbine include a tandem compound type in which the high-pressure steam turbine, the intermediate-pressure steam turbine, and the low-pressure steam turbine use one turbine rotor together and a cross compound type in which any two of the steam turbines use only one turbine rotor between two turbine rotors together. Any of a tandem compound type and a cross compound type is determined to be adopted in accordance with installation conditions, operation conditions, and maintenance conditions, and the like.

"Other Modified Example"

Both a steam turbine and an object to be driven in a gas turbine in the above-described embodiments and modified examples are generators. However, a steam turbine and an object to be driven in a gas turbine may not be generators and may be, for example, a rotary machine such as a pump.

According to an aspect of the present invention, efficiency of a steam turbine plant can be increased.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Gas turbine
20, 20a, 20b Waste heat recovery boiler (boiler)
20c Boiler
21 Low-pressure economizer
21c Economizer
22 low-pressure evaporator
22c Evaporator
23 High-pressure pump
25 High-pressure economizer
26 High-pressure evaporator
27 (First) high-pressure superheater
27c Superheater
28, 28b Second high-pressure superheater
31, 31c Low-pressure reheater (first reheater)
32, 32c Intermediate reheater (second reheater)
32b First intermediate reheater (second reheater)
33b Second intermediate reheater (second reheater)
39 Chimney
41, 41a High-pressure steam turbine
42 Intermediate-pressure steam turbine (second steam turbine, second reheated steam turbine)
43, 43b Low-pressure steam turbine (second steam turbine, first reheated steam turbine)
45 Compound type steam turbine
51 Steam condenser
53, 53c Water supply pump
54 Condensate pump
61, 62, 63, 65 Generator
71 High-pressure steam supply line
72, 72a High-pressure steam recovery line
73 Reheated intermediate-pressure steam supply line
74 Intermediate-pressure steam recovery line
76 Reheated (low-pressure) steam supply line
77 Water supply line
STP1, STP2, STP3, STP4 Steam turbine plant
EG Exhaust gas (heated fluid)
HS High-pressure steam
RHS Reheated steam
RHS1 Reheated low-pressure steam
RHS2 Reheated intermediate-pressure steam
FRHS Reheating steam
FRHS1 Reheating low-pressure steam (first reheating steam)
FRHS2 Reheating intermediate-pressure steam (second reheating steam

What is claimed is:

1. A steam turbine plant comprising:
a boiler configured to heat water using a heated fluid to generate steam; and
a steam turbine driven using the steam from the boiler,
wherein the boiler includes one or more evaporators configured to heat water which has flowed therein to a specific heat maximum temperature at constant pressure or more in which a specific heat at constant pressure is maximized using the heated fluid and to convert the water into steam and one or more reheaters configured to heat the steam which has come from the boiler using the heated fluid,
the steam turbine includes a first steam turbine configured to receive steam supplied from a high-pressure evaporator into which water with the highest pressure flows among the one or more evaporators and a second steam turbine to which the steam which has been heated by the one or more reheaters is supplied,
all the reheaters configured to supply the steam to the second steam turbine are disposed only at one side of a downstream side or an upstream side of the high-pressure evaporator in a direction in which the heated fluid flows, and
when all the reheaters are disposed only at the downstream side, all the reheaters are configured to heat reheating steam at least containing steam which has passed through the first steam turbine and having a temperature lower than a high-pressure maximum temperature which is the specific heat maximum temperature at constant pressure in the high-pressure evaporator to less than the high-pressure maximum temperature, and
when all the reheaters are disposed only at the upstream side, all the reheaters are configured to heat reheating steam at least containing steam which has passed through the first steam turbine and having a temperature higher than the high-pressure maximum temperature and
wherein the boiler includes a pump configured to change a pressure of water flowing into the high-pressure evaporator to a supercritical pressure with a pressure higher than a critical pressure.

2. The steam turbine plant according to claim 1, wherein a steam recovery line configured to send the reheating steam containing all the steam which has passed through the first steam turbine to the reheaters is connected to all the reheaters configured to supply the steam to the second steam turbine.

3. The steam turbine plant according to claim 1, wherein first reheating steam with a temperature lower than the high-pressure maximum temperature and second reheating steam with a temperature higher than the high-pressure maximum temperature are provided as the reheating steam,
a first reheated steam turbine and a second reheated steam turbine are provided as the second steam turbine,
a first reheater disposed only at the downstream side of the high-pressure evaporator and configured to heat the first reheating steam to a temperature less than the high-pressure maximum temperature is provided as one of the reheaters configured to supply steam to the first reheated steam turbine which is the second steam turbine, and
a second reheater disposed only at the upstream side of the high-pressure evaporator and configured to heat the second reheating steam is provided as one of the reheaters configured to supply steam to the second reheated steam turbine which is the second steam turbine.

4. A combined cycle plant comprising:
the steam turbine plant according to claim 1 and a gas turbine,
wherein the boiler is a waste heat recovery boiler configured to convert an exhaust gas from the gas turbine into a heated fluid.

5. A method of operating a steam turbine plant which includes a boiler configured to heat water using a heated fluid to generate steam, and a steam turbine driven using the steam from the boiler, in which the boiler includes one or more evaporators configured to heat water which has flowed therein to a specific heat maximum temperature at constant pressure or more in which a specific heat at constant pressure is maximized using the heated fluid and to convert the water into steam and one or more reheaters configured to heat the steam which has come from the boiler using the heated fluid, and the steam turbine includes a first steam turbine configured to receive steam supplied from a high-pressure evaporator into which water with the highest pressure flows among the one or more evaporators and a second steam turbine to which the steam which has been heated by the one or more reheaters is supplied, the method comprising:
supplying steam from the one or more reheaters to the second steam turbine, wherein all the reheaters configured to supply steam to the second steam turbine are disposed only at one side of a downstream side or an upstream side of the high-pressure evaporator in a direction in which the heated fluid flows,
when all the reheaters are disposed only at the downstream side, heating reheating steam at least containing steam which has passed through the first steam turbine and having a temperature lower than a high-pressure maximum temperature which is the specific heat maximum temperature at constant pressure in the high-pressure evaporator to less than the high-pressure maximum temperature in all the reheaters, and
when all the reheaters are disposed only at the upstream side, heating reheating steam at least containing steam which has passed through the first steam turbine and having a temperature higher than the high-pressure maximum temperature in all the reheaters,
supplying water at a supercritical pressure and having a temperature less than a pseudo critical temperature to the high-pressure evaporator, and
heating the water to a temperature higher than the pseudo critical temperature in the high-pressure evaporator.

6. The method of operating the steam turbine plant according to claim 5, wherein the reheating steam containing all the steam which has passed through the first steam turbine is supplied to all the reheaters configured to supply steam to the second steam turbine.

* * * * *